United States Patent
Chriki et al.

(10) Patent No.: US 12,474,591 B2
(45) Date of Patent: Nov. 18, 2025

(54) METHODS OF FABRICATION OF COMPOUND LIGHT-GUIDE OPTICAL ELEMENTS HAVING EMBEDDED COUPLING-IN REFLECTORS

(71) Applicant: Lumus Ltd., Ness Ziona (IL)

(72) Inventors: Ronen Chriki, Lod (IL); Kobi Greenstein, Ness Ziona (IL); Edgar Friedmann, Sdey-Avraham (IL); Elad Sharlin, Mishmar David (IL)

(73) Assignee: Lumus Ltd., Ness Ziona (IL)

(*) Notice: Subject to any disclaimer, the term of this patent is extended or adjusted under 35 U.S.C. 154(b) by 290 days.

(21) Appl. No.: 18/384,913

(22) Filed: Oct. 30, 2023

(65) Prior Publication Data
US 2024/0061179 A1   Feb. 22, 2024

Related U.S. Application Data

(63) Continuation of application No. 18/028,803, filed as application No. PCT/IL2022/050375 on Apr. 11, 2022, now Pat. No. 11,886,008.

(60) Provisional application No. 63/235,837, filed on Aug. 23, 2021.

(51) Int. Cl.
| | |
|---|---|
| G02B 27/14 | (2006.01) |
| F21V 8/00 | (2006.01) |
| G02B 27/01 | (2006.01) |
| B32B 38/00 | (2006.01) |
| G02B 6/25 | (2006.01) |

(52) U.S. Cl.
CPC ......... *G02B 27/145* (2013.01); *G02B 6/0036* (2013.01); *G02B 27/0172* (2013.01); *B32B 38/0004* (2013.01); *B32B 2307/416* (2013.01); *B32B 2551/00* (2013.01); *G02B 6/25* (2013.01)

(58) Field of Classification Search
None
See application file for complete search history.

(56) References Cited

U.S. PATENT DOCUMENTS

| | | | | |
|---|---|---|---|---|
| 7,643,214 B2* | 1/2010 | Amitai | ............... | G02B 27/0081 |
| | | | | 359/629 |
| 10,444,419 B2* | 10/2019 | Bhargava | ............. | G02B 6/0076 |
| 11,187,905 B2* | 11/2021 | Amitai | ................. | G02B 27/286 |
| 2008/0151379 A1* | 6/2008 | Amitai | ............... | G02B 27/0176 |
| | | | | 359/629 |

(Continued)

*Primary Examiner* — Jerry Rahll
(74) *Attorney, Agent, or Firm* — Rivka Friedman

(57) ABSTRACT

A stack has first and second faces and multiple LOEs that each has two parallel major surfaces and a first plurality of parallel internal facets oblique to the major surfaces. A first block has third and fourth faces and a second plurality of parallel internal facets. The first block and the stack are bonded such that the second face joins the third face and the first and second facets are non-parallel, forming a second block. The second block is cut at a plane passing through the first face, forming a first structure having an interfacing surface. A third block has fifth and sixth faces and a plurality of parallel internal reflectors. The third block and the first structure are bonded such that fifth face joins the interfacing surface and the internal reflectors are non-parallel to all the facets, forming a second structure. Compound LOEs are sliced-out from the second structure.

15 Claims, 31 Drawing Sheets

(56) References Cited

U.S. PATENT DOCUMENTS

| | | | |
|---|---|---|---|
| 2009/0034069 A1* | 2/2009 | Hsu | G02B 27/285 |
| | | | 359/485.01 |
| 2018/0210202 A1* | 7/2018 | Danziger | G02B 5/30 |
| 2019/0064518 A1* | 2/2019 | Danziger | G02B 6/10 |
| 2019/0293838 A1* | 9/2019 | Haba | G02B 27/14 |
| 2020/0150332 A1* | 5/2020 | Nakamura | G02B 27/145 |
| 2020/0292818 A1* | 9/2020 | Amitai | G02B 27/145 |
| 2020/0310024 A1* | 10/2020 | Danziger | G02B 6/0028 |

* cited by examiner

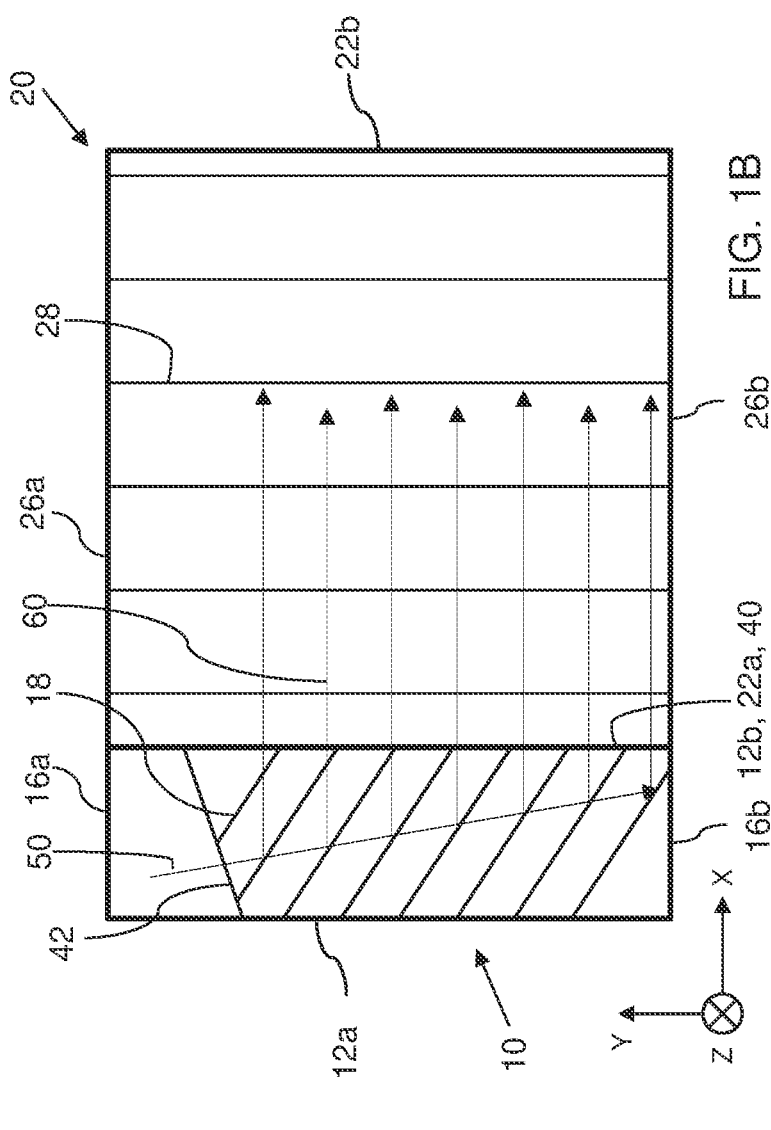
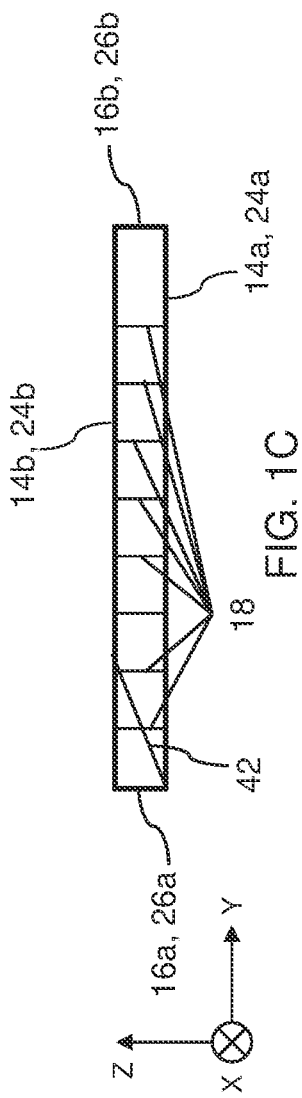
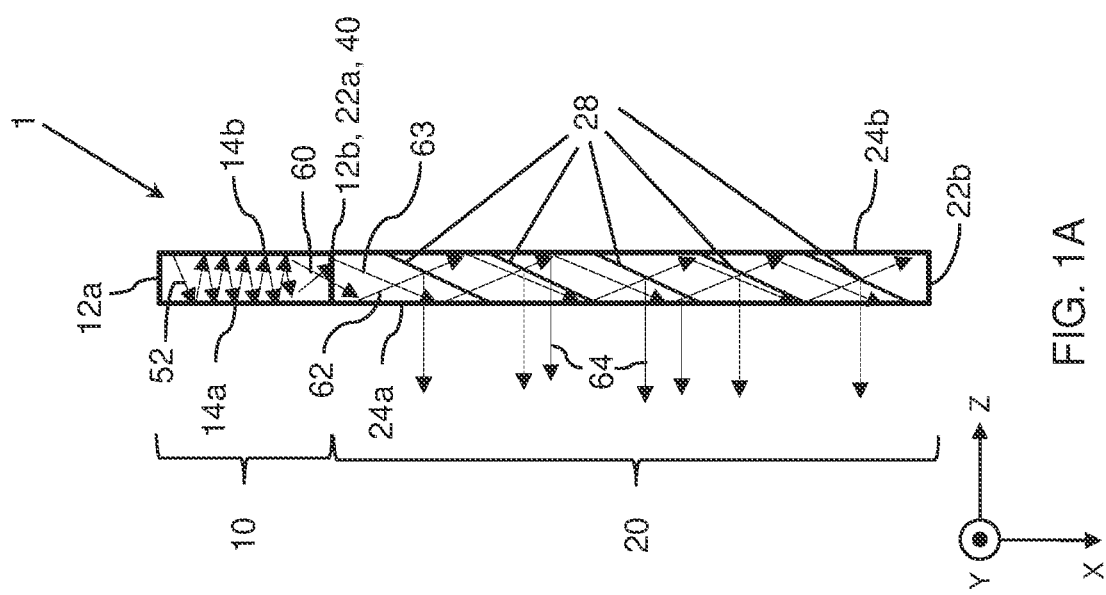

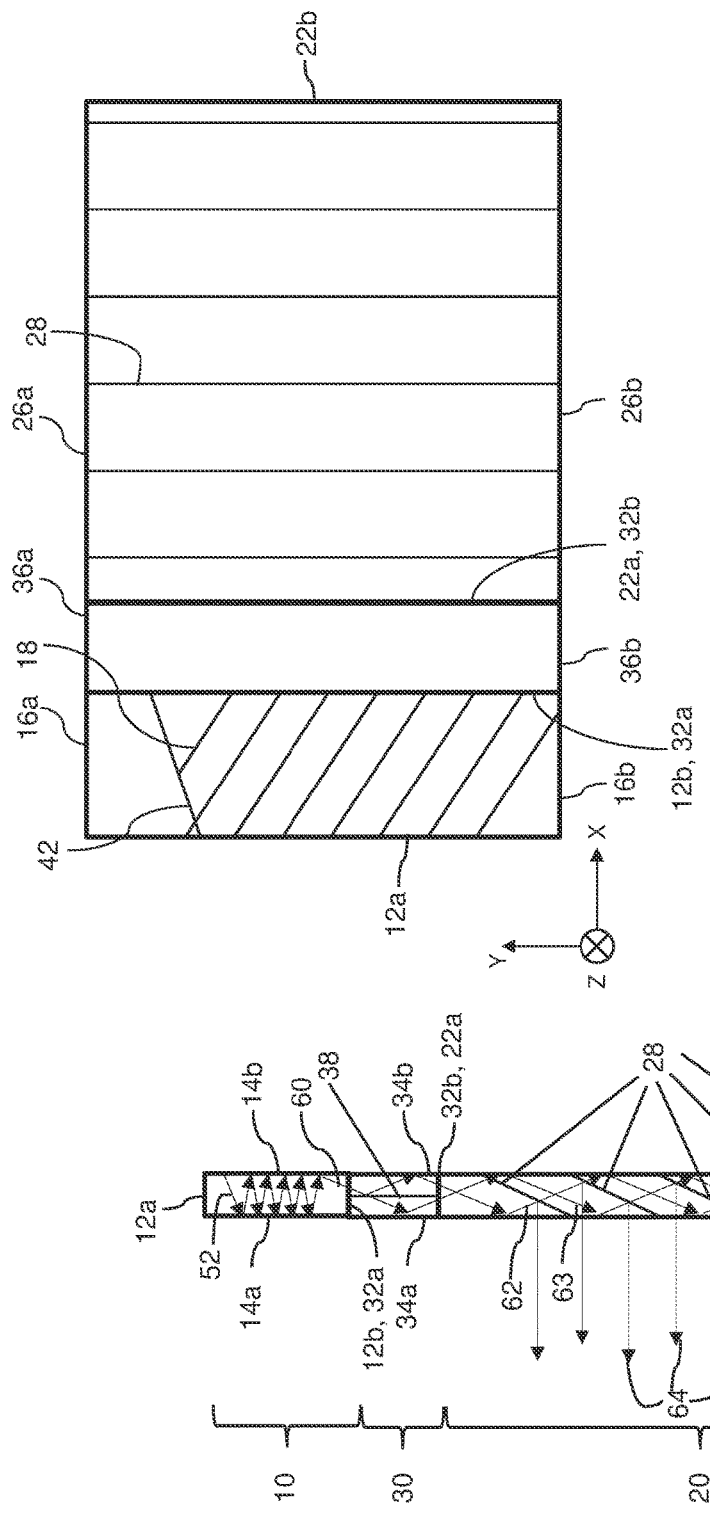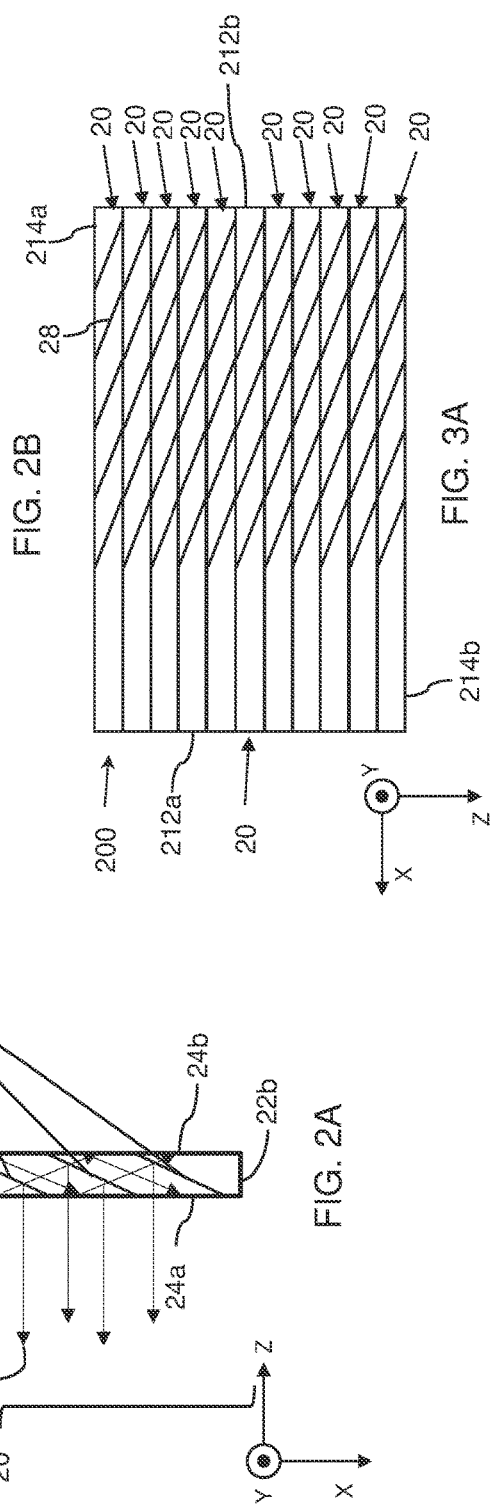

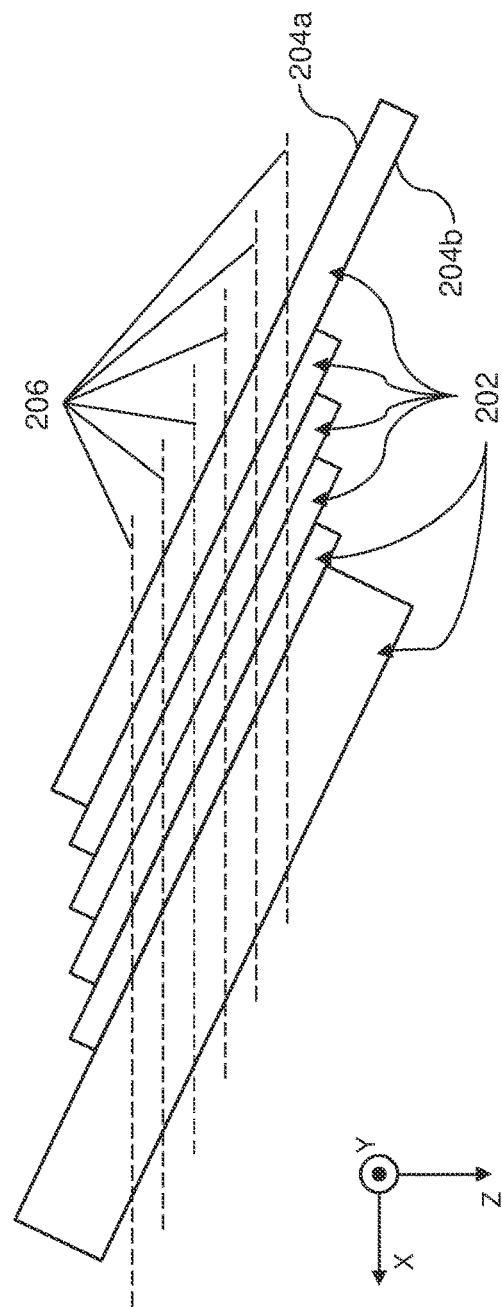
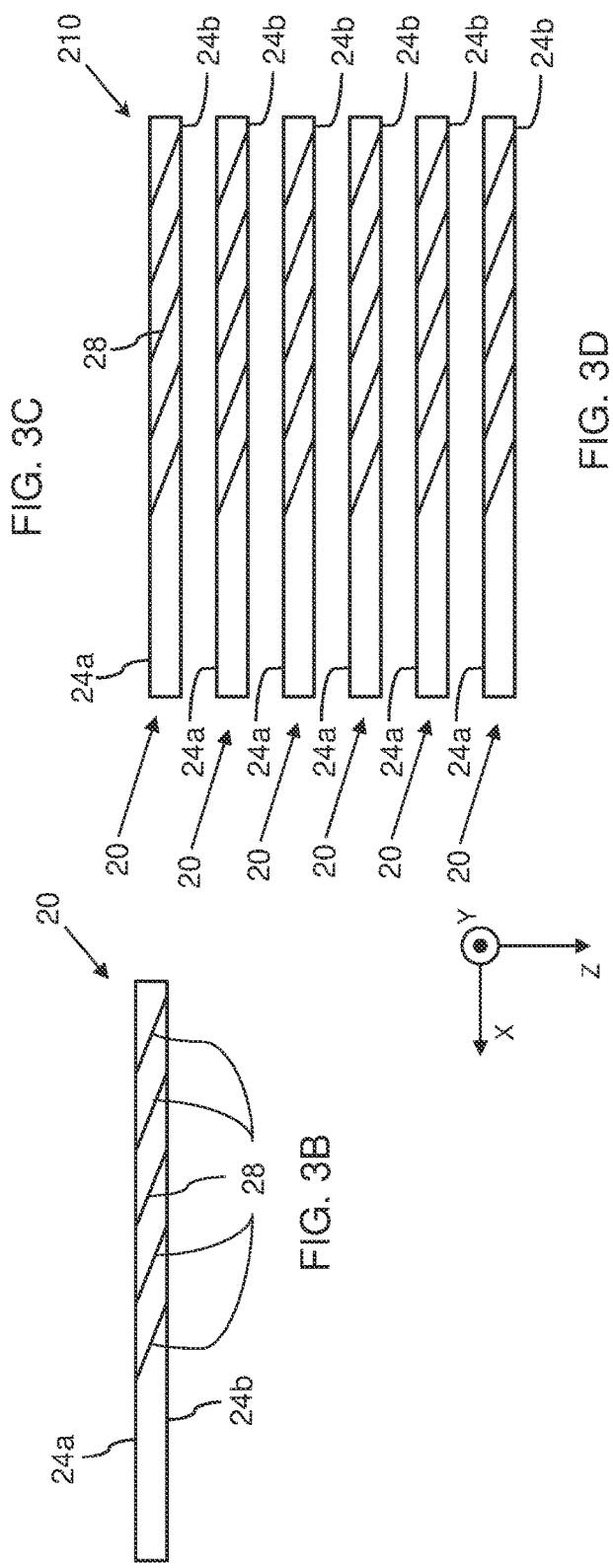
FIG. 3B
FIG. 3C
FIG. 3D

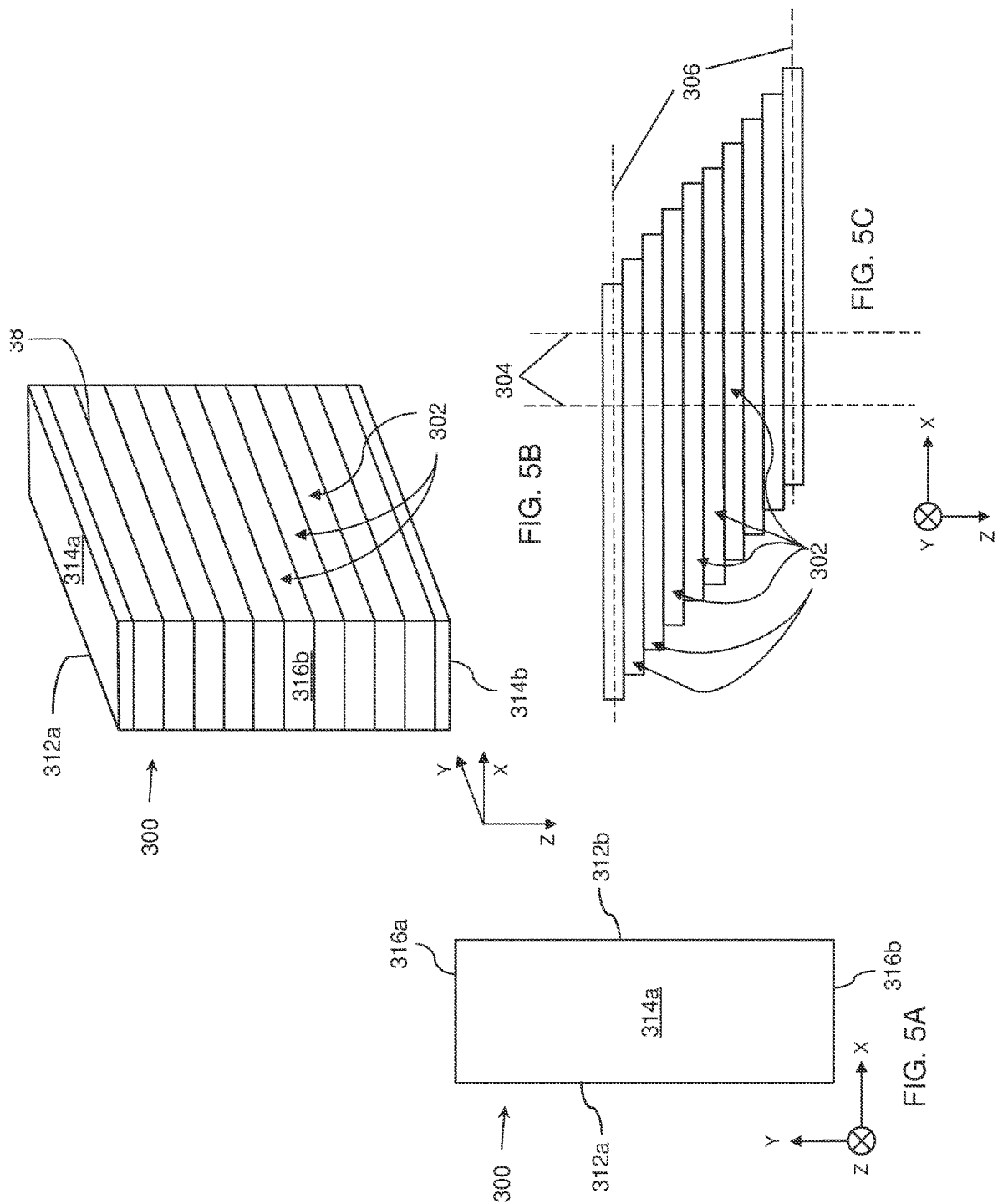

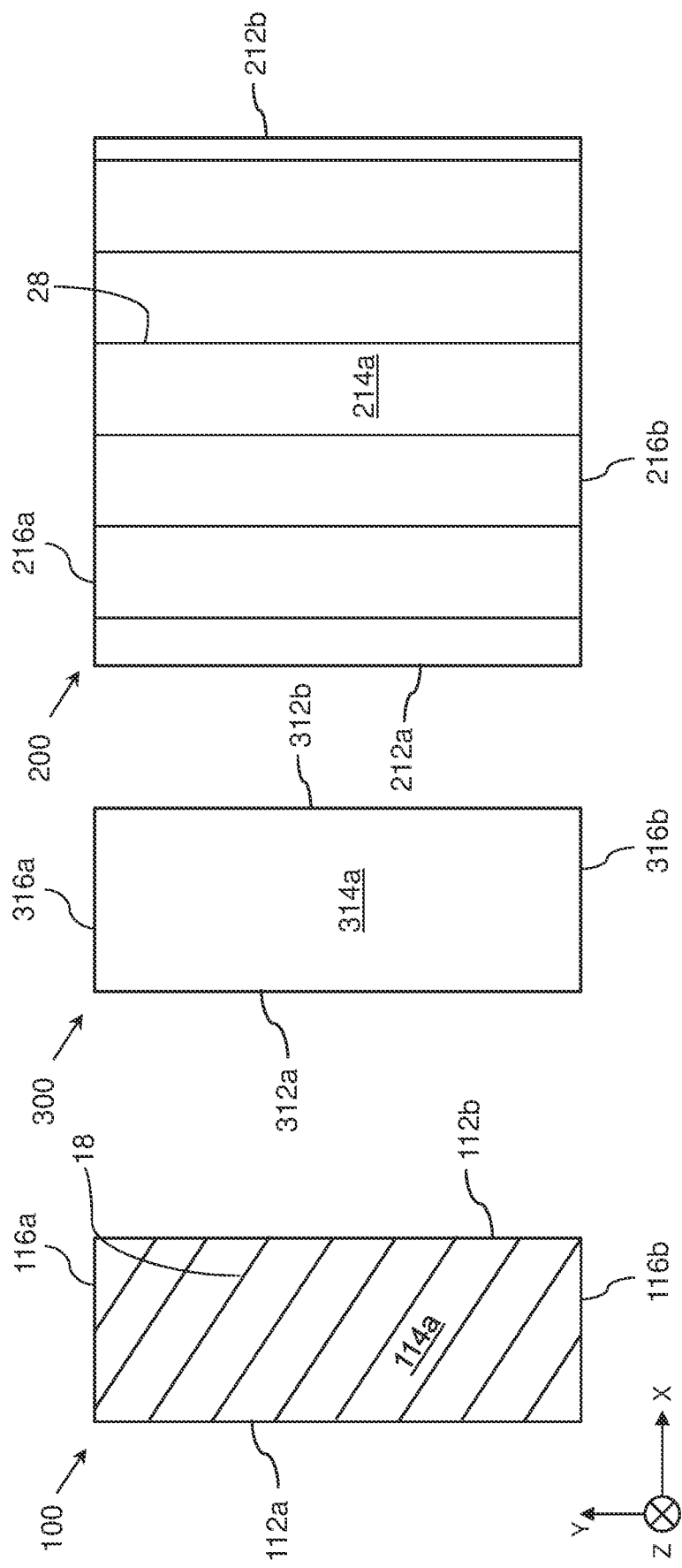

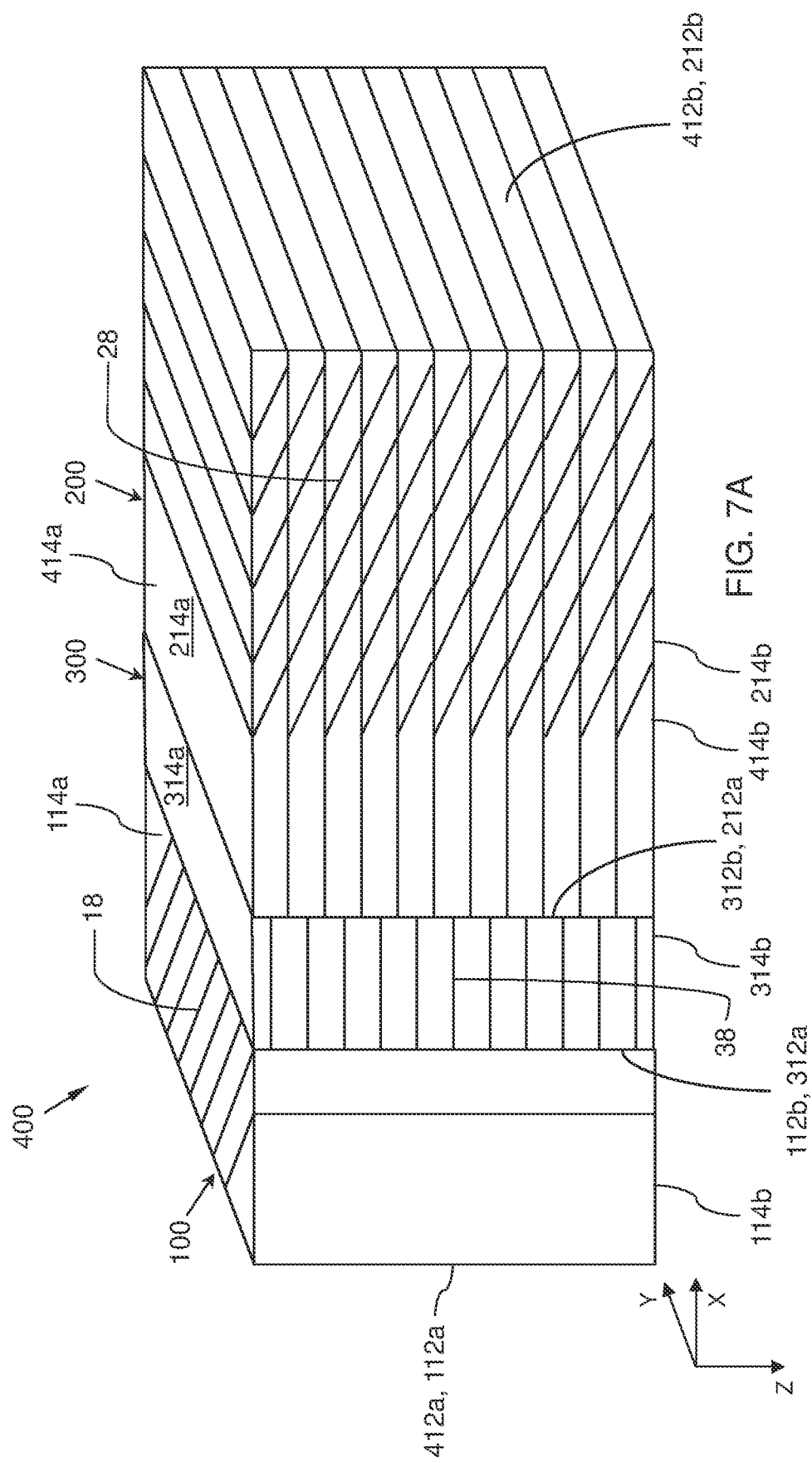

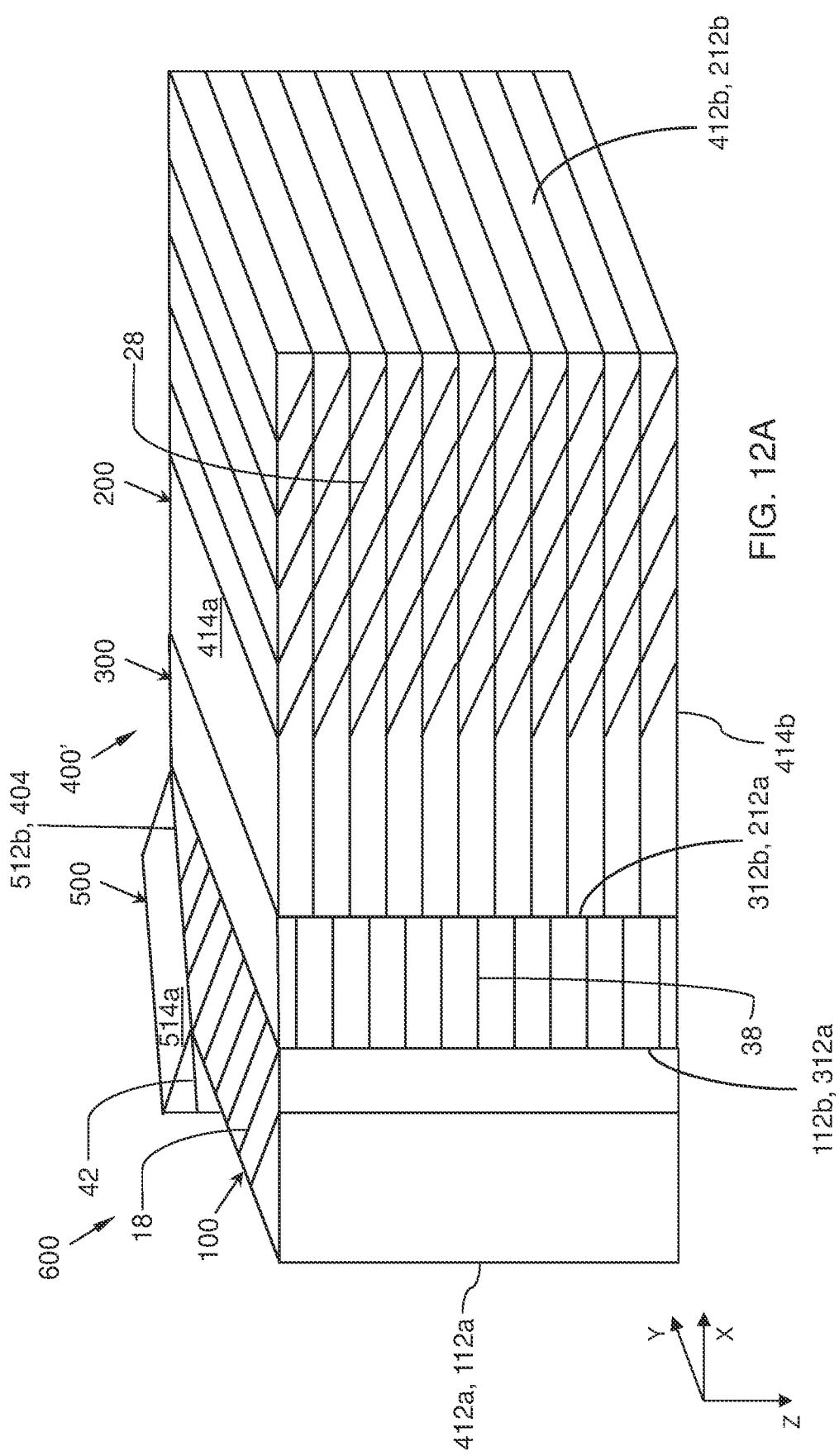

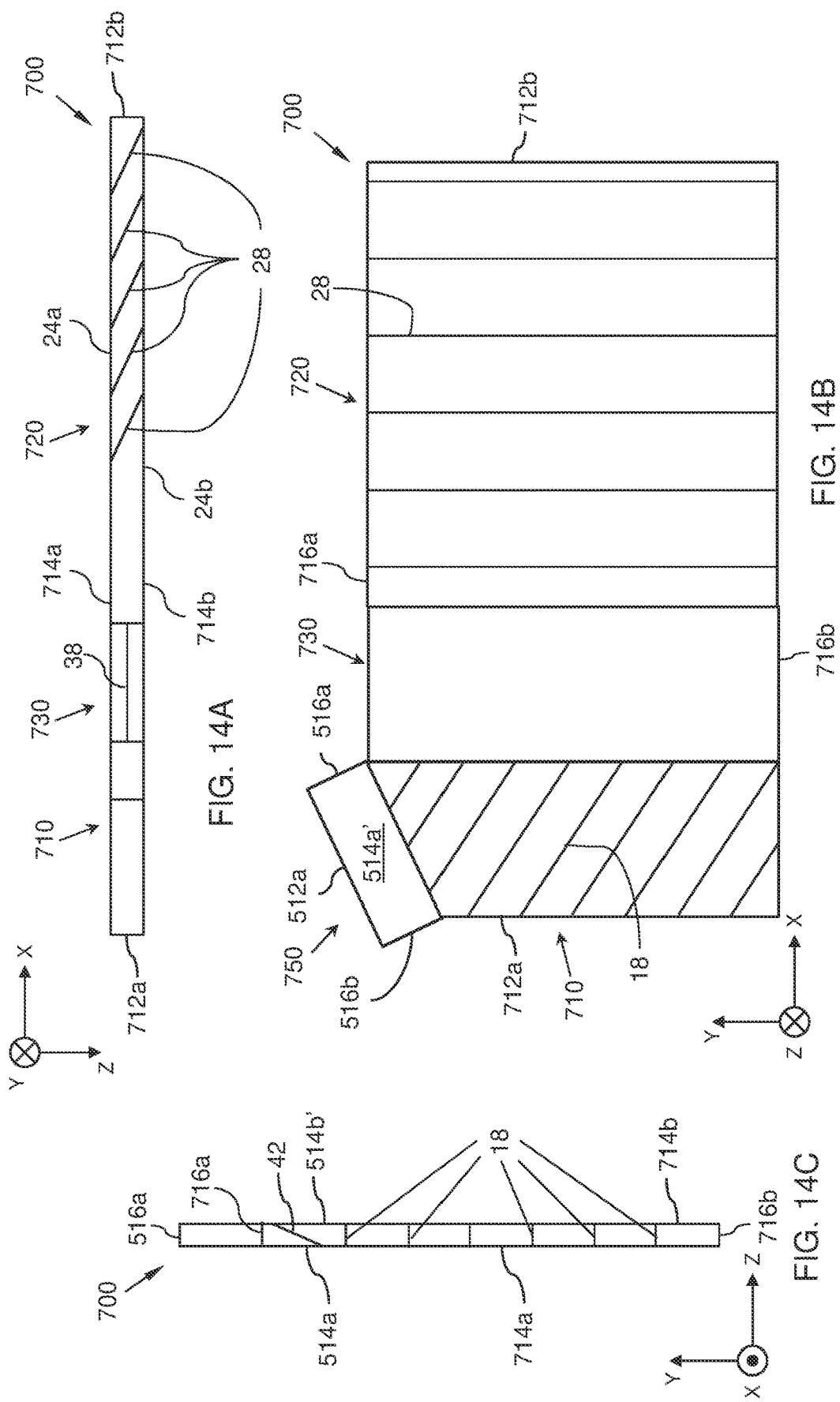

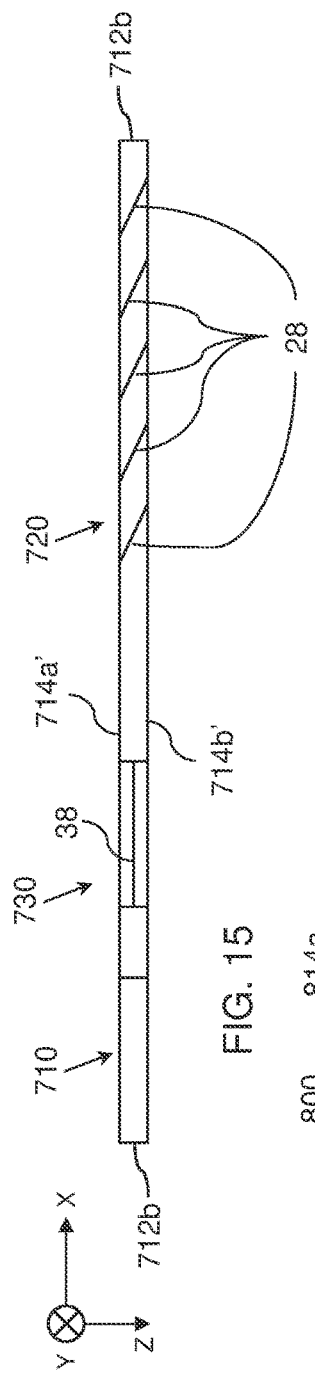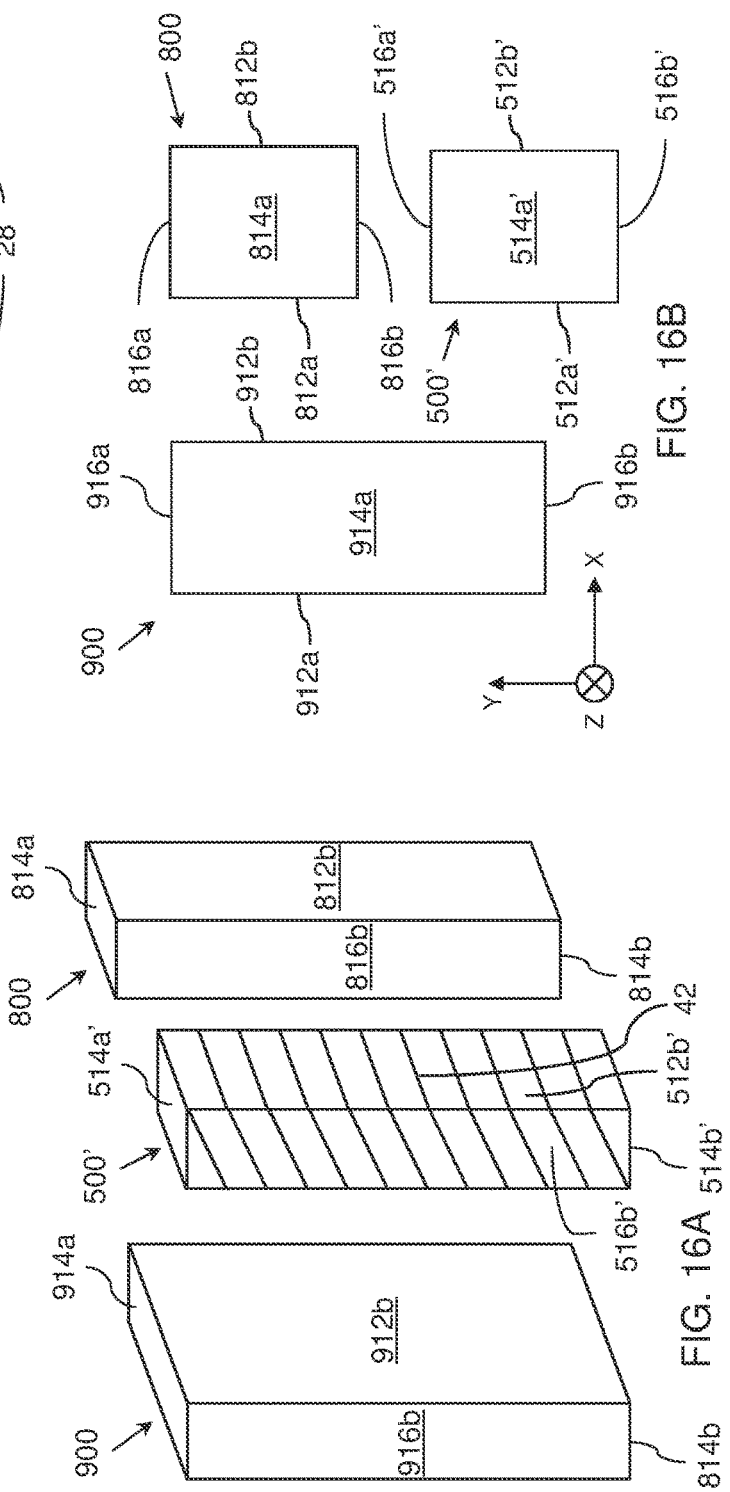

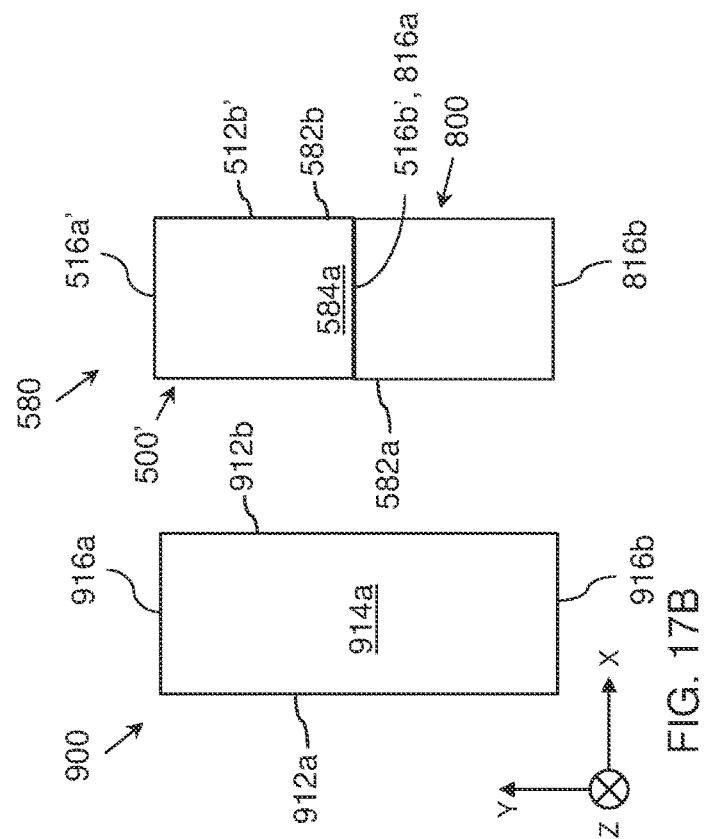
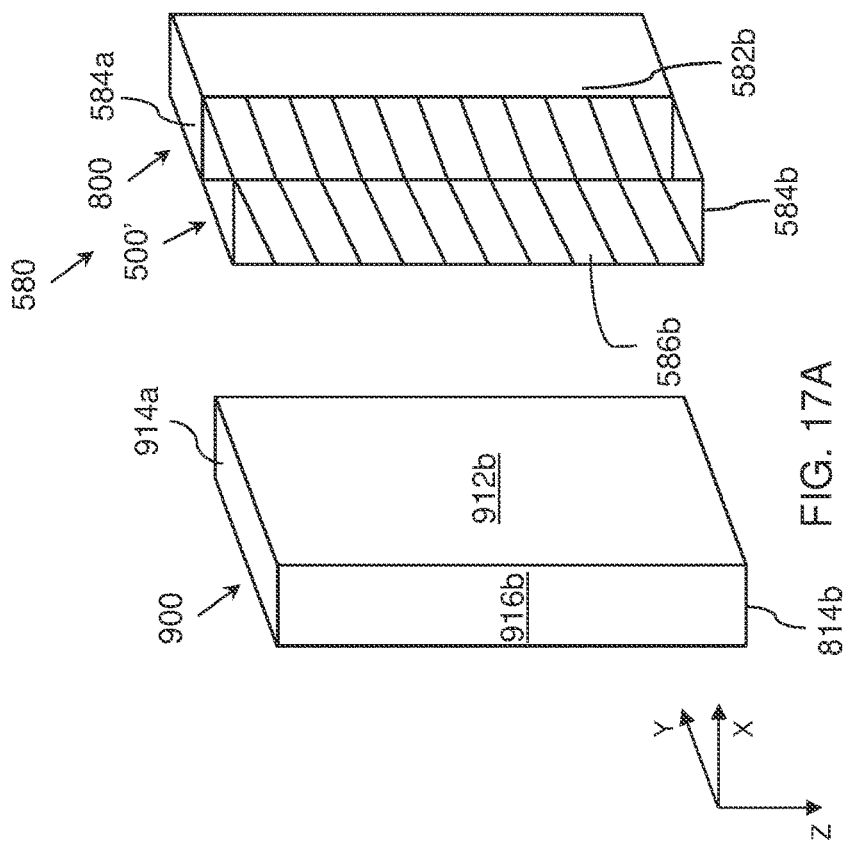
FIG. 17B
FIG. 17A

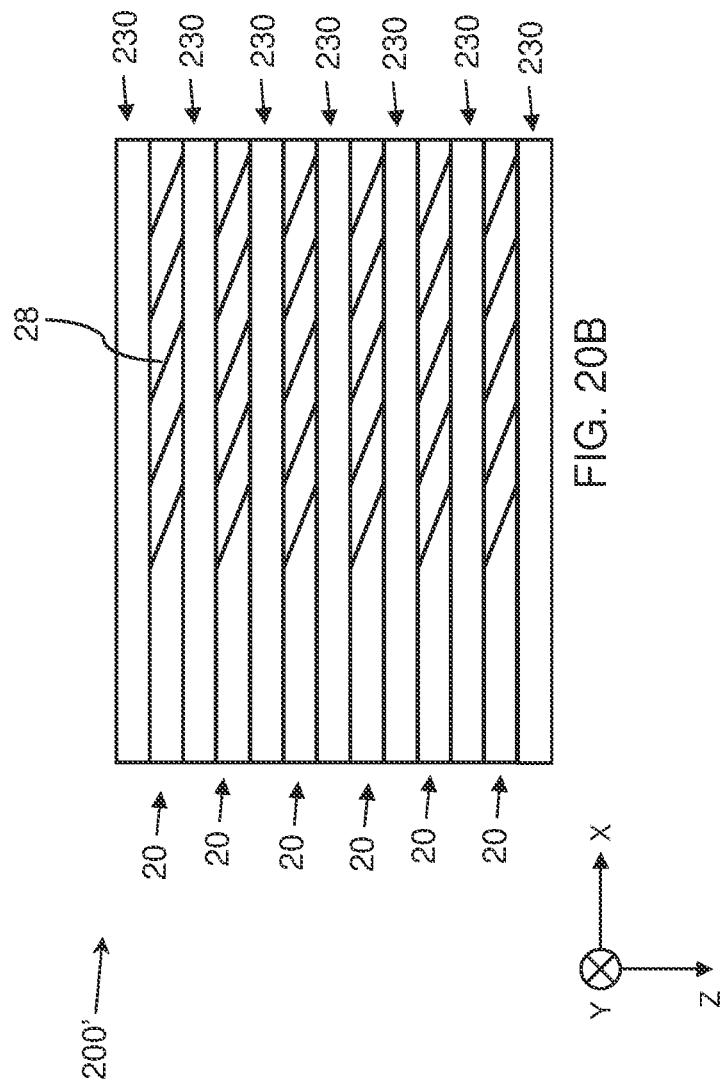

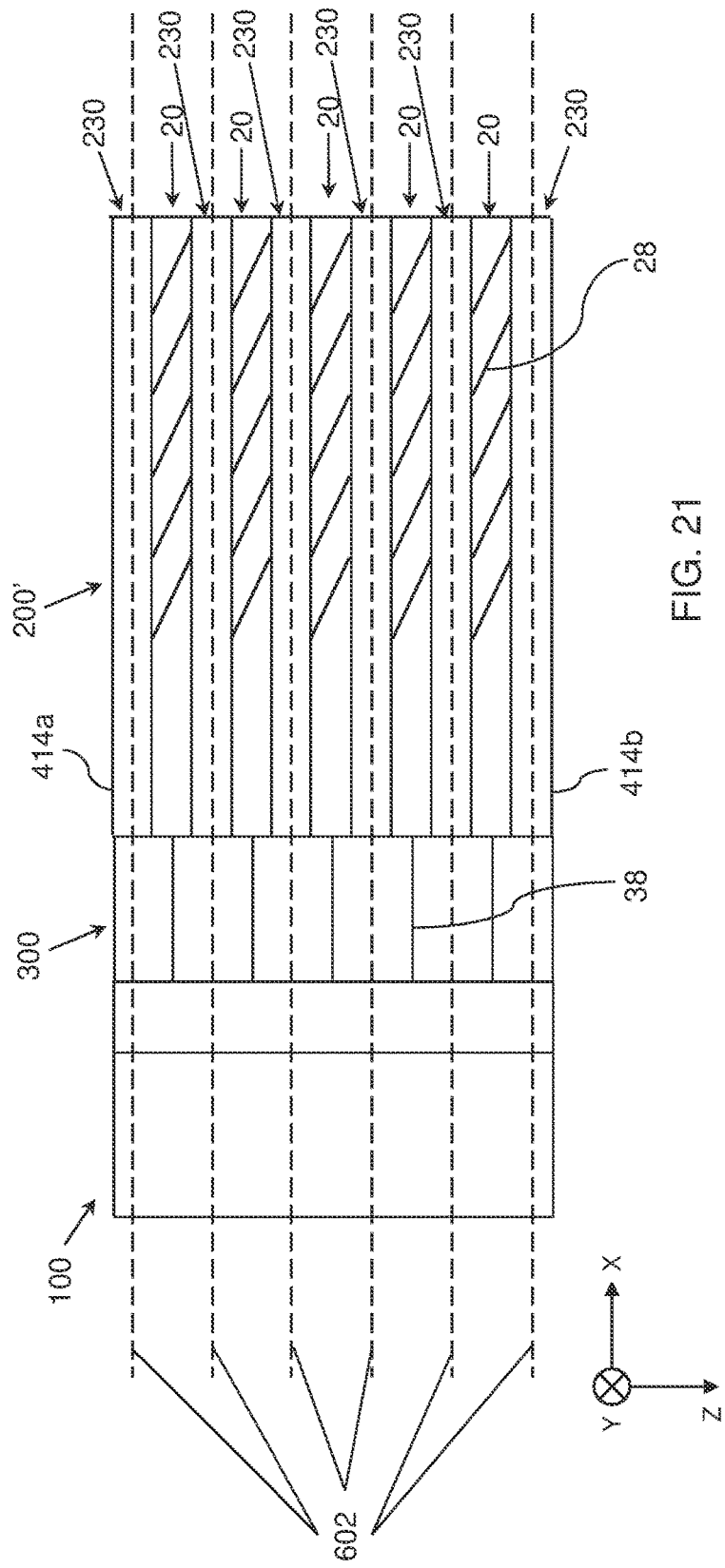
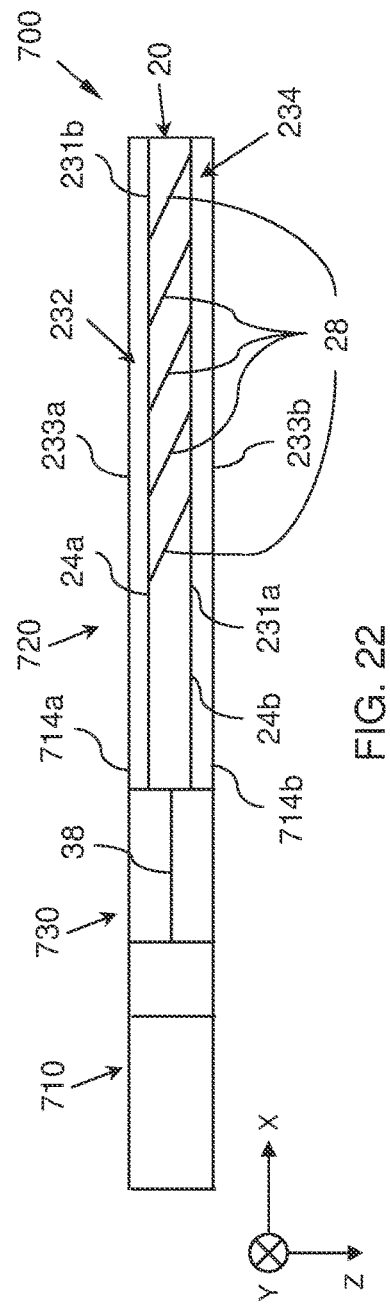
FIG. 21
FIG. 22

METHODS OF FABRICATION OF COMPOUND LIGHT-GUIDE OPTICAL ELEMENTS HAVING EMBEDDED COUPLING-IN REFLECTORS

CROSS-REFERENCE TO RELATED APPLICATIONS

This application claims priority from U.S. Provisional Patent Application No. 63/235,837, filed Aug. 23, 2021, whose disclosure is incorporated by reference in its entirety herein.

TECHNICAL FIELD

The present invention relates to light-guide optical elements (LOEs), and in particular, methods for manufacturing compound LOEs for two-dimensional aperture expansion having embedded coupling-in reflectors.

BACKGROUND OF THE INVENTION

Compound LOEs or "two-dimensional expansion waveguides" have been described in various publications by Lumus Ltd (Israel). In general terms, these compound LOEs employ two regions, each of which is a parallel-faced block of transparent material (i.e., light-transmitting material) for facilitating the propagation of light corresponding to a collimated image by internal reflection at major surfaces, and includes a set of mutually-parallel, internal, partially-reflective surfaces (or "facets"), which redirect the collimated image light while achieving expansion of the optical aperture. By combining two such elements with different facet orientations, it is possible to achieve two-dimensional expansion of the optical aperture within a single compound element, thereby expanding an input image from an image projector and outputting the expanded image over a large area towards the eye of an observer.

SUMMARY OF THE INVENTION

Embodiments of the present invention provide methods of fabrication of compound LOEs. According to the teachings of an embodiment of the present invention, there is provided a method of fabricating a compound light-guide optical element (LOE). The method comprises: obtaining a stack having a first pair of faces and a plurality of LOEs, each of the LOEs having a pair of major parallel surfaces and a first plurality of mutually parallel partially reflective internal surfaces oblique to the pair of major parallel surfaces; obtaining a first optical block having a second pair of faces and a second plurality of mutually parallel partially reflective internal surfaces; bonding together the first optical block and the stack such that one of the faces of the first pair of faces is joined to one of the faces of the second pair of faces and such that the first plurality of partially reflective internal surfaces is non-parallel to the second plurality of partially reflective internal surfaces, thereby forming a second optical block; cutting the second optical block along a cutting plane that passes through the other one of the faces of the second pair of faces, thereby forming a first optical structure having an interfacing surface at the cutting plane; obtaining a third optical block having a third pair of faces and a plurality of mutually parallel reflective internal surfaces; bonding together the third optical block and the first optical structure such that one of the faces of the third pair of faces is joined to the interfacing surface and such that the plurality of reflective internal surfaces is non-parallel to both the first plurality of partially reflective internal surfaces and the second plurality of partially reflective internal surfaces, thereby forming a second optical structure; and slicing out at least one compound LOE from the second optical structure by cutting the second optical structure through at least two cutting planes substantially parallel to the major parallel surfaces of consecutive LOEs.

Optionally, the method further comprises: for each sliced-out compound LOE, polishing external surfaces of the sliced-out compound LOE formed by cutting the optical structure along two consecutive of the cutting planes.

Optionally, the first optical block has a pair of parallel faces, and the second plurality of partially reflective internal surfaces are perpendicular to the pair of parallel faces of the first optical block.

Optionally, the first optical block has a pair of parallel faces, and the second plurality of partially reflective internal surfaces are oblique to the pair of parallel faces of the first optical block.

Optionally, the first optical block has a third plurality of mutually parallel partially reflective internal surfaces non-parallel to the first and second pluralities of partially reflective internal surfaces.

Optionally, the first optical block has a first region that includes the second plurality of partially reflective internal surfaces and a second region that includes the third plurality of partially reflective internal surfaces, the first and second regions of the first optical block are non-overlapping regions.

Optionally, the third plurality of partially reflective internal surfaces are parallel to the major parallel surfaces of the LOEs.

Optionally, each respective one of the third partially reflective internal surfaces is located in a plane that is approximately halfway between the pair of major parallel surfaces of a respective one of the LOEs.

Optionally, the third plurality of partially reflective internal surfaces is located between the first and second pluralities of partially reflective internal surfaces.

Optionally, the second plurality of partially reflective internal surfaces is located between the first and third pluralities of partially reflective internal surfaces.

Optionally, the first optical block is formed by bonding together first and second constituent optical blocks that each have a pair of faces such that one of the faces of the pair of faces of the first constituent optical block is joined to one of the faces of the pair of faces of the second constituent optical block, the first constituent optical block includes the second plurality of partially reflective internal surfaces, and the second constituent optical block includes a third plurality of mutually parallel partially reflective internal surfaces non-parallel to the first plurality of partially reflective internal surfaces and non-parallel to the second plurality of partially reflective internal surfaces.

Optionally, the third optical block and the first optical structure are bonded together such that substantially the entirety of the one of the faces of the third pair of faces is joined to substantially the entirety of the interfacing surface.

Optionally, the third optical block and the first optical structure are bonded together such that the one of the faces of the third pair of faces is joined to a fractional portion of the interfacing surface.

Optionally, the third optical block has an additional pair of faces, the method and the further comprises: obtaining an inert block having first and second pairs of faces; and bonding together the inert block and the third optical block such that one of the faces of the first pair of faces of the inert block is joined to one of the faces of the additional pair of faces of the third optical block, thereby forming a compound block having first and second faces, the first face of the compound block formed from the one of the faces of the third pair of faces and one of the faces of the second pair of faces of the inert block, and the second face of the compound block formed from the other one of the faces of the third pair of faces and the one of the faces of the second pair of faces of the inert block.

Optionally, the method further comprises: obtaining a second inert block having a pair of faces; and bonding together the second inert block and the compound block such that one of the faces of the pair of faces of the second inert block is joined to the second face of the compound block.

Optionally, bonding together the third optical block and the first optical structure includes: bonding together the compound block and the first optical structure such that the first face of the compound block is joined to the interfacing surface.

Optionally, the method further comprises: obtaining an inert block having a pair of faces; and bonding together the inert block and the third optical block such that one of the faces of the pair of faces of the second inert block is joined to the other one of the faces of the third pair of faces of the optical block.

Optionally, the stack is a bonded stack of the LOEs and a plurality of transparent spacer plates, the LOEs and the transparent spacer plates alternate along a length of the stack perpendicular to the major parallel surfaces of the LOEs.

Optionally, the at least two cutting planes are located in consecutive spacer plates having one of the LOEs therebetween.

There is also provided according to an embodiment of the teachings of the present invention a method of fabricating a compound light-guide optical element (LOE). The method comprises: obtaining a first optical block that comprises: at least a first pair of faces, a first region formed from a stack of LOEs, each of the LOEs having a pair of major parallel surfaces and a set plurality of mutually parallel partially reflective internal surfaces located between the parallel surfaces and inclined obliquely to the parallel surfaces such that the first region comprises a first plurality of partially reflective internal surfaces, and a second region having a second plurality of mutually parallel partially reflective internal surfaces non-parallel to the first plurality of partially reflective internal surfaces; cutting the first optical block along a cutting plane that passes through one of the faces of the first pair of faces, thereby forming a first optical structure having an interfacing surface at the cutting plane; obtaining a second optical block having a second pair of faces and a plurality of mutually parallel reflective internal surfaces; bonding together the first optical structure and the second optical block such that one of the faces of the second pair of faces is joined to the interfacing surface and such that the plurality of reflective internal surfaces is non-parallel to both the first plurality of partially reflective internal surfaces and the second plurality of partially reflective internal surfaces, thereby forming a second optical structure; and slicing out at least one compound LOE from the second optical structure by cutting the second optical structure through at least two cutting planes substantially parallel to the major parallel surfaces of consecutive LOEs.

Optionally, the stack is a bonded stack of the LOEs and a plurality of transparent spacer plates, the LOEs and the transparent spacer plates alternate along a length of the stack perpendicular to the major parallel surfaces of the LOEs.

Optionally, the at least two cutting planes are located in consecutive spacer plates having one of the LOEs therebetween.

Optionally, the first optical block further includes an additional pair of faces, one of major parallel surfaces of the LOE at a top end of the stack forms part of one of the faces of the additional pair of faces, and one of major parallel surfaces of the LOE at a bottom end of the stack forms part of the other one of the faces of the additional pair of faces.

Optionally, the second optical sub-block includes a first sub-block region and a second sub-block region, the second plurality of partially reflective internal surfaces are located in the first sub-block region, a third plurality of mutually parallel partially reflective internal surfaces are located in the second sub-block region, and the third plurality of partially reflective internal surfaces are non-parallel to the first plurality of partially reflective internal surfaces and non-parallel to the second plurality of partially reflective internal surfaces.

Optionally, the third plurality of partially reflective internal surfaces is located between the first and second pluralities of partially reflective internal surfaces.

Optionally, the second plurality of partially reflective internal surfaces is located between the first and third pluralities of partially reflective internal surfaces.

There is also provided according to an embodiment of the teachings of the present invention a method of fabricating a compound light-guide optical element (LOE). The method comprises: obtaining a first optical block having a first pair of faces and a first plurality of mutually parallel partially reflective internal surfaces; obtaining a second optical block formed as a stack of LOEs and having a second pair of faces, each of the LOEs having a pair of major parallel surfaces and a second plurality of mutually parallel partially reflective internal surfaces oblique to the pair of major parallel surfaces; obtaining a third optical block having a third pair of faces and a third plurality of mutually parallel partially reflective internal surfaces; bonding together the first and third optical blocks and bonding together the second and third optical blocks to form a fourth optical block, the bonding is such that: i) one of the faces of the first pair of faces is joined to one of the faces of the third pair of faces, ii) one of the faces of the second pair of faces is joined to the other one of the faces of the third pair of faces, iii) the third plurality of partially reflective internal surfaces is substantially parallel to the major parallel surfaces of the LOEs, and iv) the first, second, and third pluralities of partially reflective internal surfaces are mutually non-parallel; cutting the fourth optical block along a cutting plane that passes through the other one of the faces of the first pair of faces, thereby forming a first optical structure having an interfacing surface at the cutting plane; obtaining a fifth optical block having a fourth pair of faces and a plurality of mutually parallel reflective internal surfaces; bonding together the first optical structure and the fifth optical block to form a second optical structure, the bonding together the first optical structure and the fifth optical block is such that one of the faces of the fourth pair of faces is joined to the interfacing surface and such that the plurality of reflective internal surfaces is non-parallel to the first, second, and third pluralities of partially reflective internal surfaces; and slicing out at least one compound LOE from the second optical structure by cutting the second optical structure through at least two cutting planes substantially parallel to the major parallel surfaces of consecutive LOEs.

Optionally, the stack is a bonded stack of the LOEs and a plurality of transparent spacer plates, the LOEs and the transparent spacer plates alternate along a length of the stack perpendicular to the major parallel surfaces of the LOEs.

Optionally, the at least two cutting planes are located in consecutive spacer plates having one of the LOEs therebetween.

There is also provided according to an embodiment of the teachings of the present invention a method of fabricating a compound light-guide optical element (LOE). The method comprises: obtaining a first optical block having a first pair of faces and a first plurality of mutually parallel partially reflective internal surfaces; obtaining a second optical block formed as a stack of LOEs and having a second pair of faces, each of the LOEs having a pair of major parallel surfaces and a second plurality of mutually parallel partially reflective internal surfaces oblique to the pair of major parallel surfaces; obtaining a third optical block having a third pair of faces and a third plurality of mutually parallel partially reflective internal surfaces; bonding together the first and third optical blocks and bonding together the first and second optical blocks to form a fourth optical block, the bonding is such that: i) one of the faces of the third pair of faces is joined to one of the faces of the first pair of faces, ii) one of the faces of the second pair of faces is joined to the other one of the faces of the first pair of faces, iii) the third plurality of partially reflective internal surfaces is substantially parallel to the major parallel surfaces of the LOEs, and iv) the first, second, and third pluralities of partially reflective internal surfaces are mutually non-parallel; cutting the fourth optical block along a cutting plane that passes through the other one of the faces of the third pair of faces, thereby forming a first optical structure having an interfacing surface at the cutting plane; obtaining a fifth optical block having a fourth pair of faces and a plurality of mutually parallel reflective internal surfaces; bonding together the first optical structure and the fifth optical block to form a second optical structure, the bonding together the first optical structure and the fifth optical block is such that one of the faces of the fourth pair of faces is joined to the interfacing surface and such that the plurality of reflective internal surfaces is non-parallel to the first, second, and third pluralities of partially reflective internal surfaces, thereby forming a second optical structure; and slicing out at least one compound LOE from the second optical structure by cutting the second optical structure through at least two cutting planes substantially parallel to the major parallel surfaces of consecutive LOEs.

Optionally, the stack is a bonded stack of the LOEs and a plurality of transparent spacer plates, the LOEs and the transparent spacer plates alternate along a length of the stack perpendicular to the major parallel surfaces of the LOEs.

Optionally, the at least two cutting planes are located in consecutive spacer plates having one of the LOEs therebetween.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIGS. 1A-1C are schematic side, front, and plan views, respectively, of a compound LOE having a first LOE region with a first set of partially reflective internal surfaces and a second LOE region with a second set of partially reflective internal surfaces non-parallel to the first set of partially reflective internal surfaces;

FIGS. 2A and 2B are schematic side and front views, respectively, of a compound LOE similar to the compound LOE of FIGS. 1A-1C, but including a third region with one or more third partially reflective internal surfaces;

FIG. 3A is a schematic side view of an optical block formed as a bonded stack of LOEs that can be used to form second LOE regions of compound LOEs, according to embodiments of the present invention;

FIG. 3B is a schematic side view of one of the LOEs of the stack of FIG. 3A;

FIG. 3C is a schematic side view of a bonded stack of coated plates that can be cut at predetermined intervals to produce the LOEs of FIG. 3A;

FIG. 3D is a schematic side view of LOEs arranged in a formation prior to bonding to form the stack of FIG. 3A;

FIGS. 5A and 5B are schematic front and isometric views, respectively, of an optical block having a plurality of partially reflective surfaces that can be used to form third LOE regions of compound LOEs, according to embodiments of the present invention;

FIG. 5C is a schematic side view of a bonded stack of coated plates that can be cut at predetermined intervals to produce the optical block of FIGS. 5A and 5B;

FIGS. 6A-6C are schematic isometric, front, and side views, respectively, of the optical blocks of FIGS. 3A, 4A, 4B, 5A, and 5B in alignment prior to being bonded together, according to embodiments of the present invention;

FIGS. 7A-7C are schematic isometric, front, and side views, respectively, corresponding to FIGS. 6A-6C, showing the optical blocks bonded together to form a new optical block, according to embodiments of the present invention;

FIGS. 12A and 12B are schematic isometric and front views, respectively, corresponding to FIGS. 11A and 11B, showing the optical structure and the optical block bonded together to form a new optical structure, according to embodiments of the present invention;

FIGS. 14A-14C are schematic side, front, and plan views, respectively, of a compound LOE sliced-out from the optical structure of FIGS. 12A and 12B after cutting the optical structure along two consecutive cutting planes of FIG. 13, according to embodiments of the present invention;

FIG. 15 is a schematic side view of a final compound LOE produced from the compound LOE of FIGS. 14A-14C by polishing two of the major external surfaces of compound LOE of FIGS. 14A-14C, according to embodiments of the present invention;

FIGS. 16A and 16B are schematic isometric and front views, respectively, of a reduced-sized optical block similar to the optical block of FIGS. 10A-10C, in alignment with first and second inert blocks prior to being bonded together with the first inert block, according to embodiments of the present invention;

FIGS. 17A and 17B are schematic isometric and front views, respectively, corresponding to FIGS. 16A and 16B, showing the first inert block and the optical block bonded together to form a compound block and in alignment with the second inert block prior to the compound block and the second inert block being bonded together, according to embodiments of the present invention;

FIG. 20B is a schematic side view of the alternating LOEs and transparent cover plates of FIG. 20A bonded together to form an optical block that can be used to form a first LOE region of a compound LOE, according to embodiments of the present invention;

FIG. 21 is a schematic side view of an optical structure similar to the optical structure of FIG. 13, but in which the optical structure includes the optical block of FIG. 20B, according to embodiments of the present invention; and FIG. 22 is a schematic side view of a compound LOE sliced-out from the optical structure of FIG. 21 after cutting the optical structure along two consecutive cutting planes, according to embodiments of the present invention.

DESCRIPTION OF THE PREFERRED EMBODIMENTS

Figure 4B:
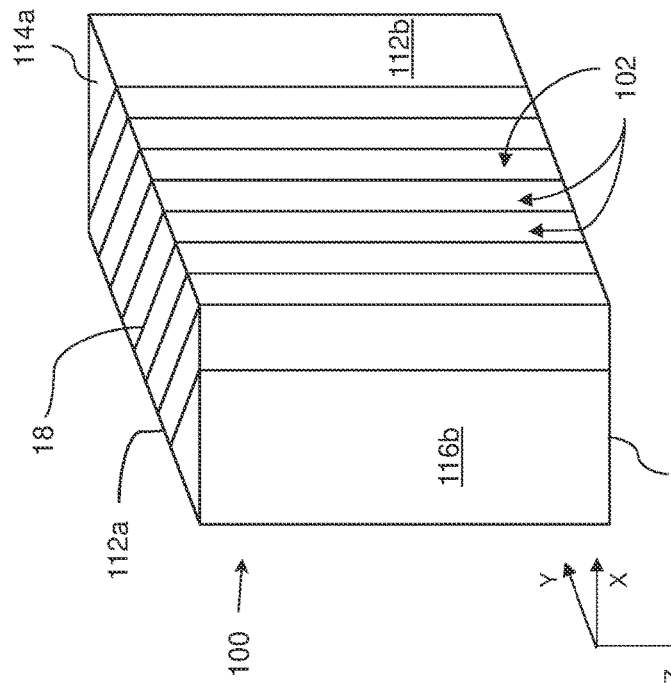
FIGS. 4A and 4B are schematic front and isometric views, respectively, of an optical block having a plurality of partially reflective surfaces that can be used to form first LOE regions of compound LOEs, according to embodiments of the present invention.

Embodiments of the present invention provide methods of fabrication of compound LOEs. The principles and operation of the methods according to present invention may be better understood with reference to the drawings accompanying the description. The accompanying drawings are provided with an xyz coordinate system that is arbitrarily labeled but which is consistent between the drawings. This xyz coordinate system is used herein to better explain the disclosed embodiments by providing a common reference frame among the drawings.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Referring now to the drawings, FIGS. 1A-1C illustrate various views of a compound LOE 1. The compound LOE 1 includes a first LOE 10 and a second LOE 20 that are bonded together at an interface 40. Typically, the two LOEs 10, 20 are manufactured separately and bonded together. Throughout this document, the term "bonded" or "bonding" should be understood to mean attached or attaching with an optical cement or glue, or any other suitable adhesive.

The first LOE 10 is formed from a light-transmitting material and includes a first pair of faces 12a, 12b (which may or may not be parallel faces), a second pair of faces (major external surfaces) 14a, 14b that is a pair of parallel faces, a third pair of faces (major external surfaces) 16a, 16b (that may or may not be parallel faces), and a plurality of mutually parallel partially reflective internal surfaces (also referred to as "facets") 18 that at least partially traverse the LOE 10 between the faces 16a, 16b. The LOE 10 is configured to guide light (image illumination), corresponding to a collimated image injected into the LOE 10 by an image projector (not shown), such that the light (represented in FIG. 1B by light ray 50) is trapped in one dimension by internal reflection (preferably but not exclusively total internal reflection) at the parallel faces 14a, 14b of the LOE 10. The LOE 10 is further configured to gradually couple the propagating (trapped) light out of the LOE 10 via the facets 18, which are inclined obliquely to the direction of propagation of the light and each reflect a proportion of the intensity of the propagating light, thereby expanding the image illumination in one dimension (which in this case is approximately along the y-axis). In the drawings, the light coupled out of the LOE 10 by the facets 18 is represented by light rays 60 (FIGS. 1A and 1B), and the propagation of the collimated image light 50 by internal reflection at the faces of the LOE 10 is represented by left-going and right-going rays 52 (FIG. 1A).

In general, the facets 18 have a first orientation in the compound LOE 1. In certain embodiments, the facets 18 are obliquely angled relative to faces 14a, 14b. In other embodiments, the facets 18 are orthogonal to the faces 14a, 14b. It is also noted that in certain embodiments the facets 18 can be obliquely angled to one or both of the faces 12a, 12b, whereas in other embodiments the facets 18 can be orthogonal to one or both of the faces 12a, 12b. In the non-limiting example embodiment illustrated in FIGS. 1A and 1B, the faces 12a, 12b are parallel, and the facets 18 are inclined obliquely to the faces 12a, 12b.

The reflectivity of the facets 18 can be provided via coatings on the internal surfaces prior to forming the LOE 10. The reflectance of each of the facets 18 may be the same, or the reflectivity of the facets 18 may be different from one another and may increase along a light propagation direction (which in the arbitrarily labeled xyz coordinate system in the drawings is along the y-axis).

The light that is coupled out of the LOE 10 is coupled into the second LOE 20. The LOE 20 is also formed from a light-transmitting material and includes a first pair of faces 22a, 22b (which may or may not be parallel faces), a second pair of faces (major external surfaces) 24a, 24b that is a pair of parallel faces, a third pair of faces (major external surfaces) 26a, 26b (that may or may not be parallel faces), and a plurality of mutually parallel partially reflective internal surfaces ("facets") 28 that are inclined obliquely relative to faces 24a, 24b. The faces 14a, 24a are generally coincident (coplanar) so as to form a first singular external face of the compound LOE 1. Likewise, the faces 14b, 24b are generally coincident (coplanar) so as to form a second singular external face of the compound LOE 1. The faces 16a, 26a are also preferably generally coincident (coplanar) so as to form a third singular external face of the compound LOE 1, and the faces 16b, 26b are also preferably generally coincident (coplanar) so as to form a fourth singular external face of the compound LOE 1. The remaining two external surfaces of the compound LOE 1 are respectively formed from the faces 12a and 22b.

The facets 28 have a second orientation in the compound LOE 1 that is non-parallel to the first orientation of the facets 18. The reflectivity of the facets 28 can be provided via coatings on the internal surfaces prior to forming the LOE 20. The reflectance of each of the facets 28 may be the same, or the reflectivity of the facets 28 may be different from one another and may increase along a light propagation direction (which in the arbitrarily labeled xyz coordinate system in the drawings is along the x-axis).

The light from LOE 10 is coupled into the LOE 20 through interface 40 (which is coincident with the face 12b and the face 22a). The LOE 20 is configured to guide the light by internal reflection (preferably but not exclusively total internal reflection) at the faces 24a, 24b, and to gradually couple the propagating light out of the LOE 20 via the facets 28, which each reflect a proportion of the intensity of the propagating light, toward the eye of an observer, thereby expanding the image illumination in a second dimension (which in this case is along the x-axis). In FIG. 1A, the propagation of image light through the LOE 20 by internal reflection at faces 24a, 24b is represented by sets of rays 62, 63. One of the rays 62, 63 represents the image and the other of the rays 62, 63 represents the image conjugate corresponding to the light 60 that coupled into the LOE 20 from the LOE 10. The light coupled out of the LOE 20 by the facets 28 is represented in FIG. 1A by light rays 64.

The image illumination that is to be coupled into the compound LOE 1 for guiding by the LOE 10 and the LOE 20 is generated by an external image projector (not shown), which is typically implemented as a micro-projector arrangement formed from a microdisplay device (such as an LCoS chip) that generates image illumination, and collimating optics for collimating the image illumination to produce collimated image illumination. The collimated image illumination is coupled into the LOE 10 by a coupling-in optical arrangement, in the form of a highly reflective internal surface 42 in a coupling-in region of the LOE 10.

In order to fill the LOE 20 with the collimated image illumination (whereby both the image and its conjugate propagate through the LOE by internal reflection) while maintaining a small input aperture (small projector), it is preferable to employ at least one additional partially reflective internal surface having a particular orientation relative to the facets 18, 28 and the faces of the compound LOE. FIGS. 2A and 2B illustrate a compound LOE having such an additional facet 38. The facet 38 can be deployed in part of the LOE 10, or as shown in FIGS. 2A and 2B as part of a separate light-transmitting substrate 30 having three pairs of faces 32a, 32b, 34a, 34b, 36a, 36b (where the pair of faces 34a, 34b is a pair of parallel faces). The facet 38 is parallel to the faces 14a, 14b, 24a, 24b, and thus has an orientation that is non-parallel to the orientations of the facets 18, 28. When using only a single facet 38, the facet 38 is preferably located halfway between faces 24a, 24b (and equivalently halfway between faces 14a, 14b). If using more than one facet 38, the facets 38 are preferably evenly spaced between faces 24a, 24b. In the embodiment illustrated in FIGS. 2A and 2B, the LOE 10 and the substrate 30 are bonded together at faces 12b, 32a, and the substrate 30 and the LOE 20 are bonded together at faces 22a, 32b, such that the facet 38 is located between the sets of facets 18, 28. It is noted however that other deployments are also possible, for example in which the facets 18 are located between the facet 38 and the set of facets 28, depending on the design specification of the specific application for the compound LOE.

In the illustrated embodiment, the light 60 (coupled-out by facets 18) is partially reflected by the facet 38. The reflected and transmitted parts of light 60 are coupled into the LOE 20, and correspond to rays 62 and 63, respectively.

Further details of compound LOEs, including compound LOEs that may be similar to the compound LOEs illustrated in FIGS. 1A-2B, can be found in various publications by Lumus Ltd. (Israel), including, for example, US Patent Application Publication No. 2021/0247608, PCT publication WO 2021/240513, PCT publication WO 2021/152602, PCT publication WO 2021/001841, and U.S. Pat. No. 10,551,544.

Embodiments of the present invention are directed to methods of fabricating compound LOEs. The compound LOEs that are fabricated according to the methods of the present invention may be different in structure from the compound LOEs illustrated in FIGS. 1A-2B, but have similar components, as will become apparent from the ensuing description. The fabrication method steps are described in detail below with reference to FIGS. 3A-21, and generally include steps of obtaining an optical block 400 (FIGS. 7A-7C) having sets of the requisite facets 18, 28 (and preferably also a set of facets 38) embedded in regions of the optical block 400 and appropriately oriented relative to each other such that the facets 18, 28 (and 38) are mutually non-parallel, cutting a portion of the optical block 400 at a prescribed cutting plane (FIGS. 8A and 8B) that is at a prescribed angle and passes through particular faces of the optical block 400 to form an optical structure 400' having an interfacing surface (FIGS. 9A and 9B) formed at the cutting plane, obtaining an additional optical block 500 (FIGS. 10A-10D) having a set of reflective internal surfaces 42 embedded therein, and bonding the optical block 500 to the optical structure 400' at the interface surface to form an intermediate optical structure 600 (FIGS. 12A and 12B) having embedded therein sets of the requisite facets 18, 28 (and preferably also a set of facets 38) and a set of the reflective internal surfaces 42 that is non-parallel to the facets 18, 28, 38. The intermediate optical structure 600 is then cut along two or more cutting planes in order to slice-out one or more compound LOEs (FIGS. 13-14B), where each compound LOE has facets 18 and facets 28 (and preferably also at least one facet 38) and an embedded reflective internal surface 42. Each of the sliced-out compound LOEs can then be polished to achieve a final compound LOE having a desired thickness (FIG. 15). In certain embodiments, one or more blocks 800, 900 of inert material are bonded to the optical block 500 to form a compound block 590 (FIGS. 16A-18B), which is then bonded to the optical structure 400' (FIGS. 19A and 19B) to form the intermediate optical structure 600. As will be discussed, obtaining the optical block 400 can include producing the optical block 400 by obtaining various other optical blocks 100, 200, 300 (FIGS. 3A-5C) and bonding those optical blocks 100, 200, 300 together to form the optical block 400. Each of the optical blocks 100, 200, 300 has one of the requisite sets of facets 18, 28, 38 embedded therein, and can be produced from sets of bonded coated plates that are cut at appropriate angles and thickness.

It is noted that in the drawings, and in accordance with one set of non-limiting embodiments of the present invention, each of the various blocks 100, 200, 300, 400, 500, 800, 900 is represented as a rectangular cuboid, i.e., a structure having three pairs of parallel faces that are mutually perpendicular (orthogonal). However, such representation of the blocks as rectangular cuboids is for clarity of presentation only, and parallelism and perpendicularity among all of the faces of the individual blocks is not a strict requirement from an optical standpoint or a manufacturing standpoint. In many embodiments, only one pair of faces of a block need be a pair of parallel faces, and the remaining faces may or may not be parallel. In other embodiments, none of the faces of a block need be a pair of parallel faces.

The following paragraphs describe the structure and production of the optical block 200 with reference to FIGS. 3A-3D. Referring first to FIG. 3A, there is shown the optical block 200, which is formed as a stack of LOEs 20 that are bonded together. The optical block 200 has at least two pairs of faces (major external surfaces), namely a pair of preferably parallel faces 212a, 212b, and a pair of faces 214a, 214b that is a pair of parallel faces and may be orthogonal (perpendicular) to either or both the faces 212a, 212b. The optical block 200 also includes a third pair of faces that may or may not be a pair of parallel faces, and may also be perpendicular to one or more of the faces 212a, 212b, 214a, 214b. The third pair of faces are not shown in FIG. 3A, but are shown in various other drawings, including FIGS. 6B, 7B, 8B, 9B, 11B, 12B, and 19B. As will become apparent, the faces 214a and 214b can respectively form part of upper and lower face of the optical structure 600 (FIGS. 11C and 11D) from which a compound LOE can be sliced-out.

Each of the LOEs 20 in the stack of FIG. 3A is an LOE as illustrated in FIG. 3B. This LOE 20 is also generally similar to the second LOE 20 discussed above with reference to FIGS. 1A-2C. As shown in FIG. 3B, and as discussed above with reference to FIGS. 1A-2C, each LOE 20 is formed from a light-transmitting material having parallel faces 24a, 24b and a set (plurality) of internal facets 28 inclined obliquely to the faces 24a, 24b. Such an LOE can be used as a standalone LOE (together with appropriate coupling-in optics) in situations in which aperture expansion in only one-dimension is desired. This type of LOE is commonly referred to as a "one-dimensional" LOE, and the structure and methods of manufacturing such one-dimensional LOEs have been described extensively in various publications by Lumus Ltd. (Israel), including, for example, U.S. Pat. Nos. 7,634,214, 8,873,150, PCT publication WO 2016/103263, and PCT publication WO 2020/212835.

FIG. 3C shows one example method of fabricating a plurality of LOEs 20, which can be used to produce the optical block 200. In FIG. 3C, a plurality of light-transmitting plates is coated to form coated plates 202 which are stacked and bonded together, and then cut along equally spaced parallel cutting planes 206 (which in the arbitrarily labeled xyz coordinate system are parallel to the xy plane). Each of the plates 202 has a pair of parallel faces (surfaces) 204a, 204b which are appropriately coated with coatings that provide the reflectivity of the facets 28 (such that the facets 28 are partially reflective). The cutting planes 206 are oblique to the faces 204a, 204b and define the oblique angle of the facets 28, and the resulting cuts along the cutting planes 206 define the faces 24a, 24b of the LOEs 20. The cutting planes 206 are spaced at predetermined intervals. Preferably the predetermined intervals are uniform intervals such that the cutting planes 206 are uniformly spaced. The uniform spacing is preferably in the range of 1-2 millimeters, such that the thickness of each LOE 20 (measured between faces 24a, 24b) is approximately 1-2 millimeters.

Figure 4C:
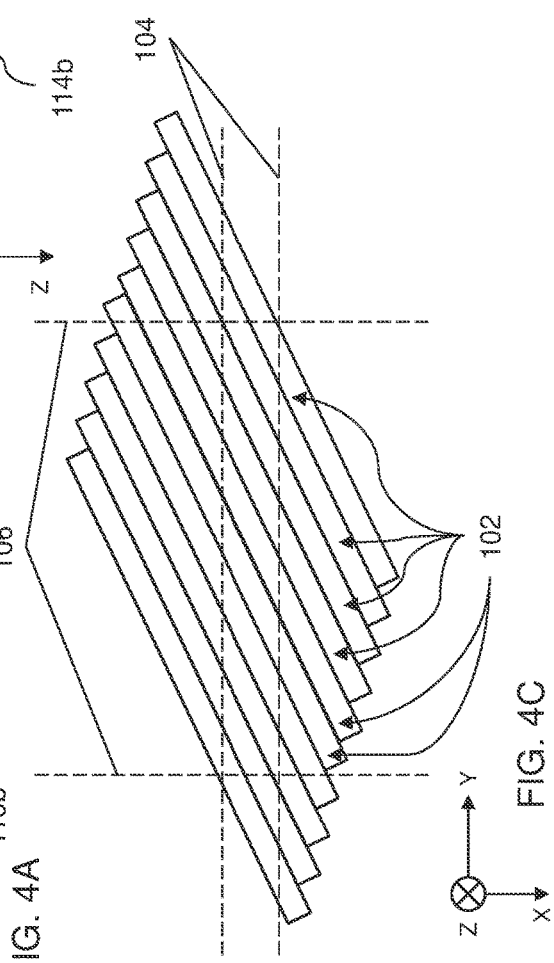
FIG. 4C is a schematic front view of a bonded stack of coated plates that can be cut at predetermined intervals to produce the optical block of FIGS. 4A and 4B.
Figure 4A:
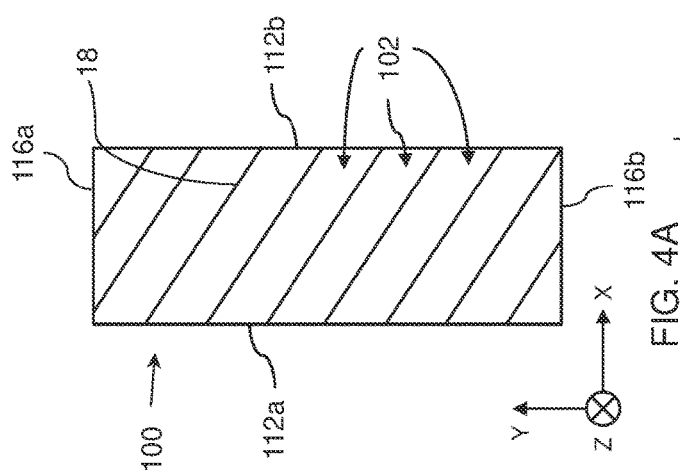

Prior to bonding together the LOEs 20 to form the optical block 200, the LOEs 20 are first aligned and arranged in a formation 210 (FIG. 3D). The LOEs 20 in the formation 210 are then bonded together to form the optical block 200 (FIG. 3A) as a bonded stack of LOEs 20, such that the faces 24a and 24b of adjacent (consecutive) LOEs 20 are joined together at bonding regions, and such that the sets of internal facets 28 of the LOEs 20 constitute a plurality of facets 28 of the optical block 200. As can be seen from FIGS. 3A and 3D, the major surface 24a of the LOE 20 at the top end of the stack 200 forms the top face 214a of the stack 200, and the major surface 24b of the LOE 20 at the bottom end of the stack 200 forms the bottom face 214b of the stack 200. The following paragraphs describe the structure and production of the optical block 100 with reference to FIGS. 4A-4C. Referring first to FIGS. 4A and 4B, the optical block 100 is formed from a light-transmitting material and has an embedded set of the facets 18. The optical block 100 includes three pairs of faces (major external surfaces), namely a pair of faces 112a, 112b (which may or may not be parallel faces), a pair of preferably parallel faces 114a, 114b, and a pair of faces 116a, 116b (which may or may not be parallel faces). In certain embodiments, the pairs of faces of the optical block 100 are mutually orthogonal (perpendicular), which can simplify the fabrication process.

The optical block 100 can be formed from a plurality of bonded, transparent coated plates 102 (each plate being formed from a light-transmitting material and coated with a partially reflective coating) to form facets 18 that are angled relative to the faces 114a, 114 at a predetermined angle, i.e., the facets 18 may be inclined obliquely relative to the faces 114a, 114b or may be orthogonal to the faces 114a, 114b.

The facets 18 may also be inclined obliquely to the faces 112a, 112b at a predetermined angle. Various known methods exist for forming the optical block 100. FIG. 4C illustrates one such method, in which the coated plates 102 are stacked and bonded together (similar to as in FIG. 3C), and then cut along a first pair of preferably parallel cutting planes 104 and along a second pair of preferably parallel cutting planes 106 that are preferably perpendicular to the planes 104, in order to extract the optical block 100. In embodiments in which the facets 18 are oblique to one or both of the faces 112a, 112b, the angle of the cutting planes 104 relative to the faces of the coated plates 102 determines the angle at which the facets 18 are inclined relative to faces 112a, 112b. In addition, the cuts along the cutting planes 104 define the faces 112a, 112b of the optical block 100, and the cuts along cutting planes 106 define the faces 116a, 116b of the optical block 100.

In certain embodiments, such as the embodiment illustrated in FIG. 4C, the cutting planes 104, 106 are perpendicular to the thickness dimension of the plates 102 such that the resultant facets 18 are perpendicular to the faces 114a, 114b of the optical block 100. In the arbitrarily labeled xyz coordinate system used in the drawings, when the cutting planes 104, 106 are perpendicular to the thickness dimension of the plates 102, the cutting planes 104 are parallel to the yz plane and the cutting planes 106 are parallel to the xz plane. The cutting planes 106 are perpendicular to the planes 104.

As noted above, other embodiments are possible in which the facets 18 are inclined obliquely to the faces 114a, 114b, and as such the cutting planes 106 may be inclined at an appropriate oblique angle relative to the xz plane to produce the appropriate facet angle relative to the faces 114a, 114b.

The following paragraphs describe the structure and production of the optical block 300 with reference to FIGS. 5A-5C. Referring first to FIGS. 5A and 5B, the optical block 300 is formed from a light-transmitting material and has an embedded set of the facets 38. The optical block 300 includes three pairs of faces (major external surfaces), namely a pair of faces 312a, 312b (which may or may not be parallel faces), a pair of preferably parallel faces 314a, 314b, and a pair of faces 316a, 316b (which may or may not be parallel faces). In certain non-limiting embodiments, the pairs of faces of the optical block 100 are mutually orthogonal (perpendicular).

The optical block 300 can be formed from a plurality of bonded, transparent coated plates 302 (each plate being a formed from a light-transmitting material and coated with a partially reflective coating) to form facets 38 that are parallel to faces 314a, 314b and optionally perpendicular to one or both faces 312a, 312b. Various known methods exist for forming the optical block 300. FIG. 5C illustrates one such method, in which the coated plates 302 are stacked and bonded (similar to as in FIGS. 3C and 4C), and then cut along a pair of cutting planes 304 in order to extract the optical block 100. In certain embodiments, such as the embodiment illustrated in FIG. 5C, the planes 304 are parallel planes (which in the arbitrarily labeled xyz coordinate system are parallel to the yz plane). However, as alluded to above, parallelism between the planes 304 is not a strict requirement, and in certain cases it may be advantageous to cut along non-parallel cutting planes, which can improve compactness and overall form factor of the final compound LOE product. In certain embodiments, the planes 304 are perpendicular to the major external surfaces (faces) of the plates 202. However, this perpendicularity is also not an optical requirement for producing the final compound LOE product, but is rather a matter of practical convenience when fabricating the compound LOE. The stacked and bonded plates may also be cut along an additional pair of cutting planes 306 that pass through two of the plates, and may be parallel to the major external surfaces of the plates 202 and perpendicular to planes 304. In the arbitrarily labeled xyz coordinate system used in the drawings, the cutting planes 306 are parallel to the xy plane.

Figure 6A:
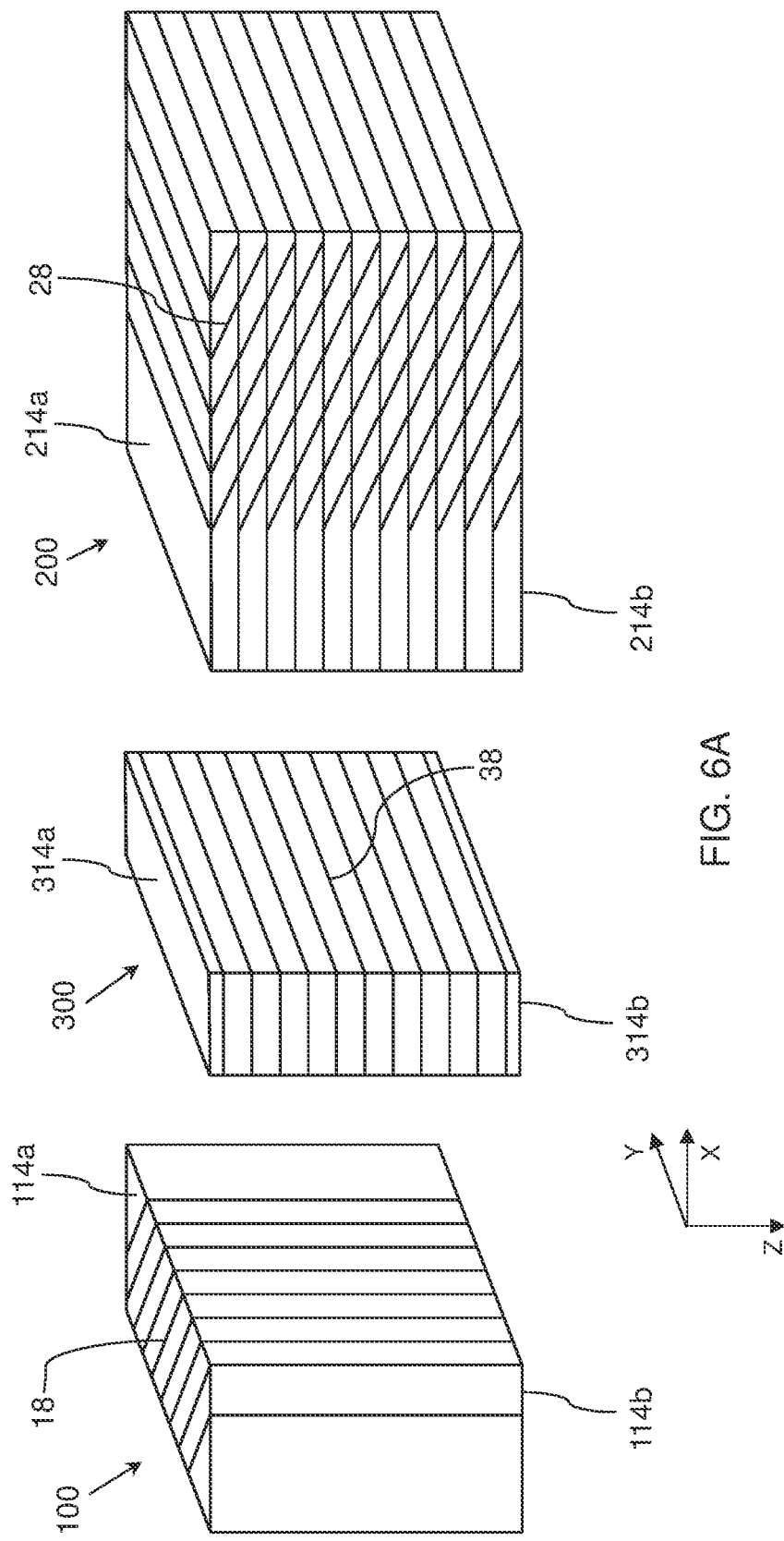
Figure 6C:
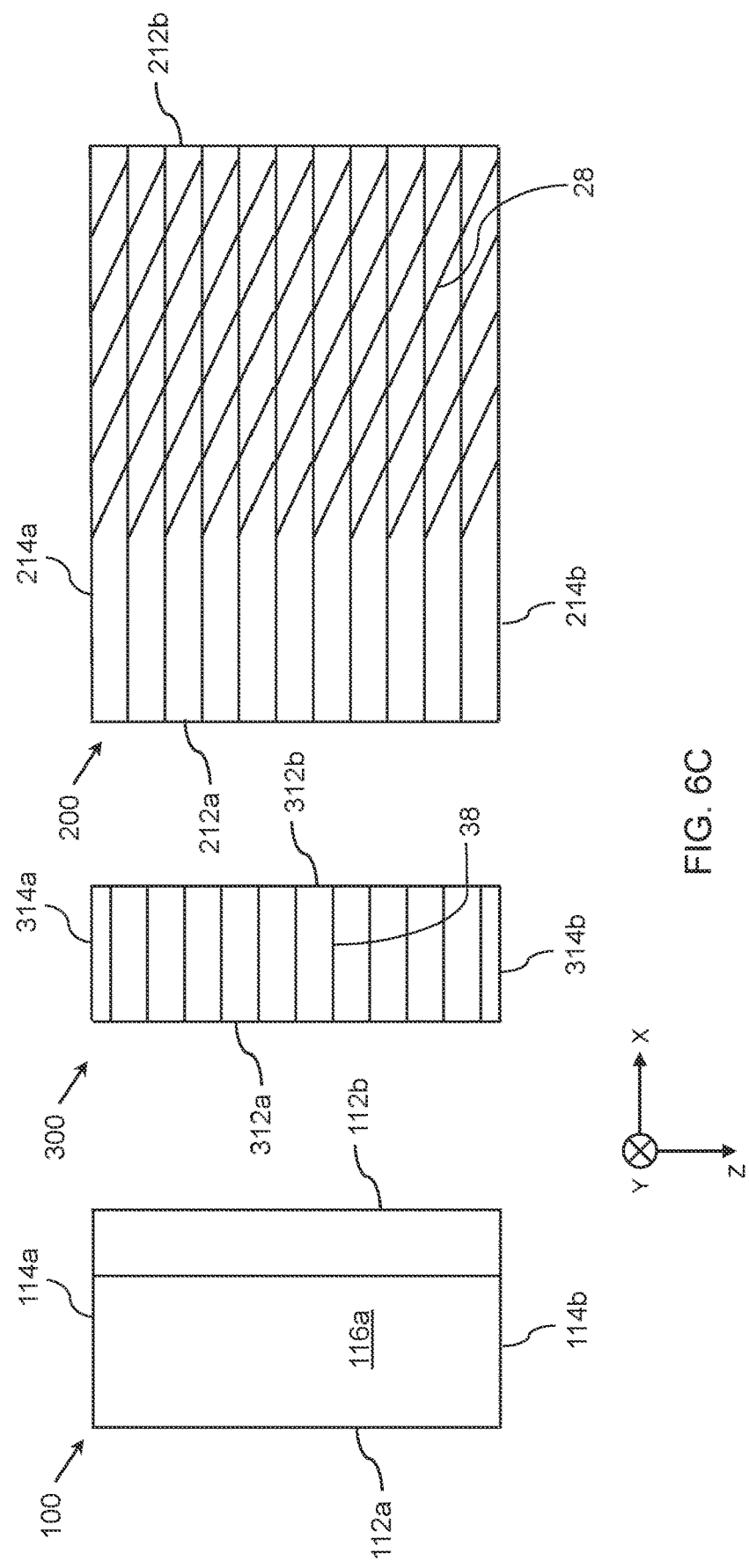
Figure 7B:
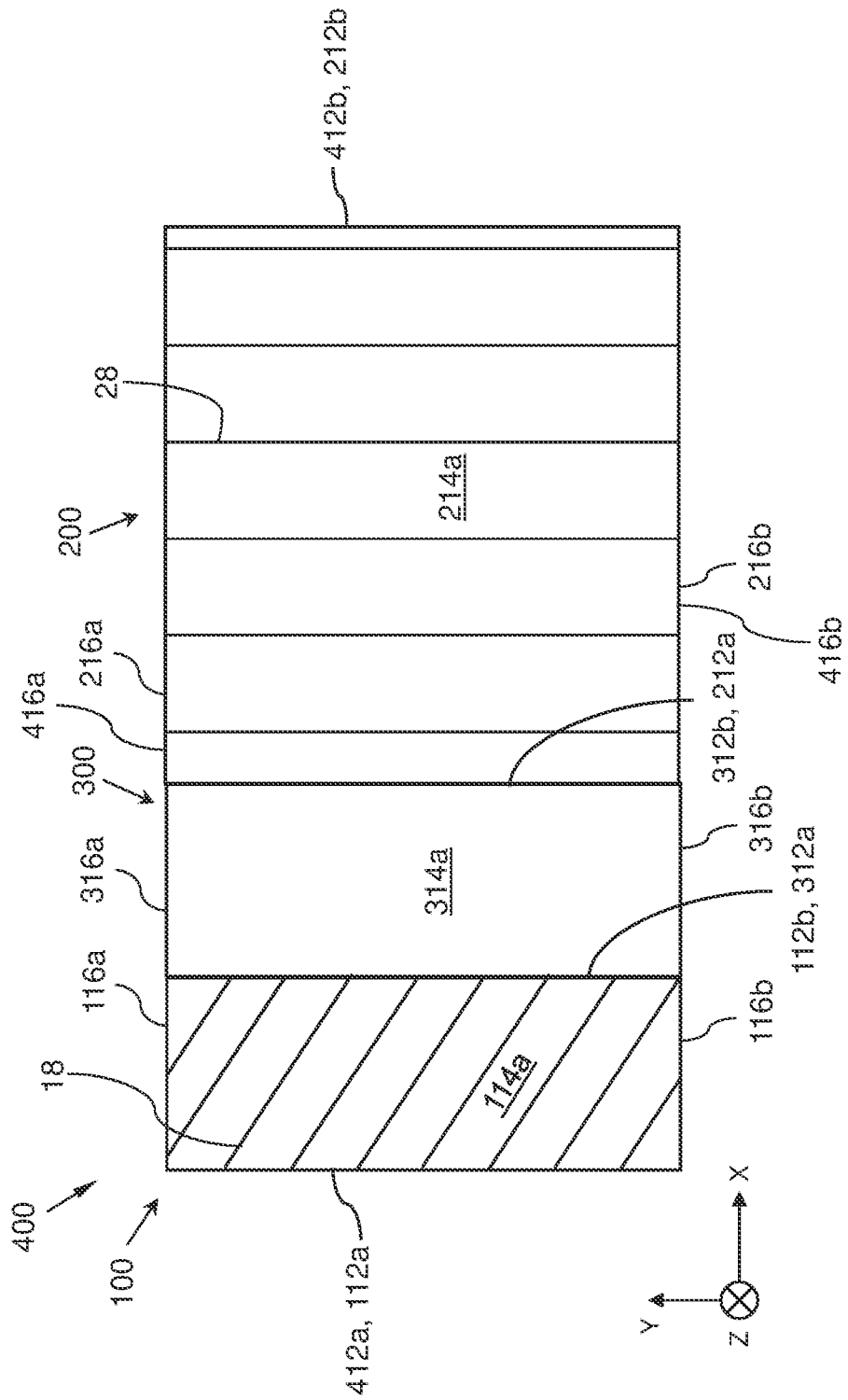
Figure 7C:
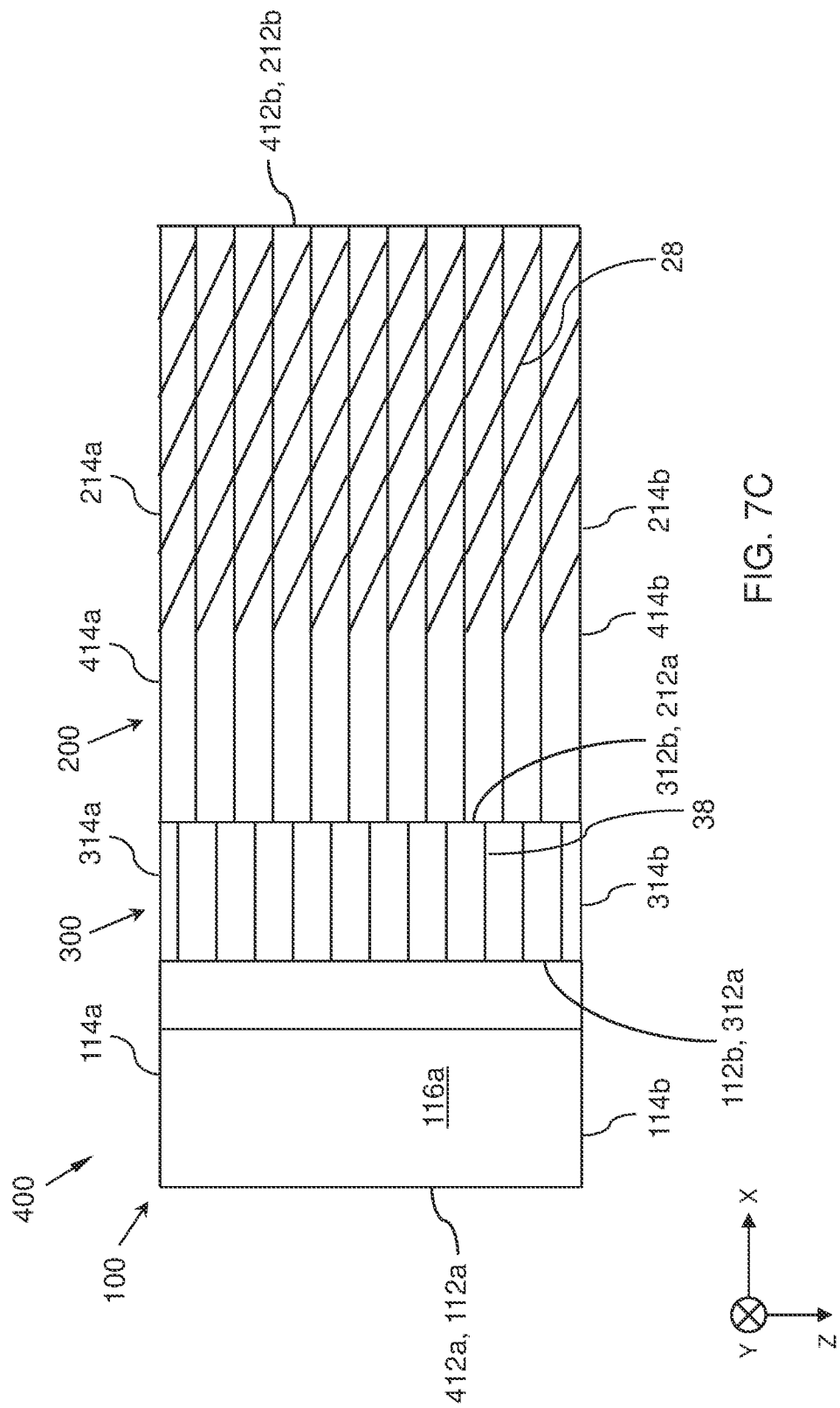

With continued reference to FIGS. 1A-5C, refer now to FIGS. 6A-6C which show the three optical blocks 100, 200, 300 prior to being bonded together to form the optical block 400 (FIGS. 7A-7C). Prior to bonding, it is important that the optical blocks 100, 200, 300 are appropriately aligned such that the orientation of the facets 18 is non-parallel to the orientation of the facets 28, and such that the orientation of the facets 38 is non-parallel to the orientations of the facets 18, 28. In other words, the blocks 100, 200, 300 are aligned such that the facets 18, 28, 38 are mutually non-parallel.

It also preferable that the optical block 300 is aligned with the optical block 200 such that the facets 38 of optical block 300 are in planes that are parallel to the planes of faces 214a, 214b of the optical block 200. In embodiments in which each compound LOE is to have only a single facet 38, the optical blocks 200 and 300 are preferably aligned such that each respective facet 38 is located in a plane that is approximately halfway between the major external surfaces 24a, 24b of a respective one of the LOEs 20 that forms the optical block 200. In embodiments in which each compound LOE is to have multiple facets 38 (say N facets 38), the optical blocks 200 and 300 are preferably aligned such for each set of N facets 38, the N facets 38 are evenly spaced between the major external surfaces 24a, 24b of a respective one of the LOEs 20 that forms the optical block 200. It is noted, however, that the block 300 can be positioned relative to the block 200 without applying too much scrutiny with respect to the positioning of the facets 38 relative to the major external surfaces 24a, 24b, and that any mispositioning of the facets 38 relative to the major external surfaces 24a, 24b in a sliced-out compound LOE can be corrected (typically by polishing or grinding) at the final stages of fabrication if there are enough spare regions in the sliced-out compound LOE.

With reference to the coordinate system shown in FIGS. 6A-6C, the alignment of the optical blocks 100, 200, 300 (when each such optical block is constructed as a rectangular cuboid) can be understood as follows: each of the faces 112a, 212a, 312a is in a plane parallel to the yz plane, each of the faces 112b, 212b, 312b is in a plane parallel to the yz plane, each of the faces 114a, 214a, 314a is in a plane parallel to the xy plane, each of the faces 114b, 214b, 314b is in a plane parallel to the xy plane, each of the faces 116a, 216a, 316a is in a plane parallel to the xz plane, and each of the faces 116b, 216b, 316b is in a plane parallel to the xz plane. The alignment of the optical blocks 100, 200, 300 is also such that each of the facets 38 is in a plane that is parallel to the xy plane.

In order to reduce wastage, the optical blocks 100, 200, 300 are preferably designed to have the same or very close to the same dimensions i.e., length, width, and thickness. In the arbitrarily labeled xyz coordinate system in the drawings, the length is measured along the y-axis, i.e., measured between faces 116a, 116b, faces 216a, 216b, and faces 316a, 316b. In the arbitrarily labeled xyz coordinate system in the drawings, the width is measured along the x-axis, i.e., measured between faces 112a, 112b, faces 212a, 212b, and faces 312a, 312b. In the arbitrarily labeled xyz coordinate system in the drawings, the thickness is measured along the z-axis, i.e., measured between faces 114a, 114b, faces 214a, 214b, and faces 314a, 314b.

Employing optical blocks 100, 200, 300 having the same thickness (or very close to the same thickness) is critical to minimizing wastage from the final cutting step to slice-out compound LOEs. Therefore, in particularly preferred embodiments, the alignment of the optical blocks 100, 200, 300 is such that the faces 114a, 214a, 314a are coplanar (i.e., lie in a common plane), the faces 114b, 214b, 314b are coplanar, the faces 112a, 212a, 312a are coplanar, the faces 112b, 212b, 312b are coplanar, the faces 116a, 216a, 316a are coplanar, and the faces 116b, 216b, 316b are coplanar.

Once properly aligned, the optical blocks 100, 200, 300 are bonded together as illustrated in FIGS. 7A-7C to form the optical block 400 (which is a compound optical block composed of multiple sub-blocks), while maintaining the alignment described with reference to FIGS. 6A-6C. In the illustrated embodiment, the optical block 400 is a rectangular cuboid and has three regions, namely one region having the optical block (stack) 200 which carries the bonded LOEs 20 with facets 28, another region having the optical block 300 which carries the facets 38, and another region having the optical block 100 which carries the facets 18. In the illustrated embodiment, the three regions are non-overlapping, and the three optical blocks 100, 200, 300 have the same thickness. In such embodiments, the faces 112a, 212b form a first pair of parallel faces 412a, 412b of the optical block 400, the face 414a (formed from coplanar faces 114a, 214a, 314a) and the face 414b (formed from coplanar faces 114b, 214b, 314b) form a second pair of parallel faces of the optical block 400, and the face 416a (formed from coplanar faces 116a, 216a, 316a) and the face 416b (formed from coplanar faces 116b, 216b, 316b) form a third pair of parallel faces of the optical block 400. It is noted that in embodiments in which the block 400 is not a rectangular cuboid, neither one of the three pairs of faces 412a, 412b, 414a, 414b, 416a, 416b necessarily needs to be a pair of parallel faces.

As can be seen from FIGS. 3A, 3D, 7A and 7D, the major surface 24a of the LOE 20 at the top end of the stack 200 forms part of the top face 414a of the optical block 400, and the major surface 24b of the LOE 20 at the bottom end of the stack 200 forms part of the bottom face 414b of the optical block 400.

In certain embodiments, the optical blocks 100, 200, 300 can be bonded together in stages. For example, the optical blocks 200, 300 can be bonded together, and then the optical blocks 100, 300 can be bonded together. Alternatively, the optical blocks 100, 300 can be bonded together, and then the optical blocks 200, 300 can be bonded together. The optical blocks 200, 300 are bonded together such that the face 312b is joined to the face 212a. The optical blocks 100, 300 are bonded together such that the face 112b is joined to the face 312a. As a result of the bonding (and proper aligning) of the optical blocks 100, 200, 300, the facets 18 are non-parallel to the facets 28.

In certain embodiments, such as the embodiments illustrated in the drawings, the optical blocks 100, 200, 300 are arranged such that the optical block 300 is positioned between the optical block 100, 200, resulting in the facets 38 being located between the facets 18, 28. However, other embodiments are possible in which the order of the optical blocks is different from that shown in the drawings, for example in which the optical block 100 is positioned between the optical block 200, 300, resulting in the facets 18 being located between the facets 28, 38. In such embodiments, the face 312a of the optical block 300 forms the face 412a of the optical block 400.

The embodiments described thus far have pertained to employing three optical blocks to form compound optical block 400. However, in certain embodiments the optical block 300 can be omitted or replaced with one or more optical blocks carrying facets at different orientations from the facets 38. Therefore, the optical block 400 can generally be considered as being formed from two optical sub-blocks and having two regions, where the optical block 200 with facets 28 forms a first of the sub-blocks (a first region), and the optical block 100 with facets 18 forms a second of the sub-blocks (a second region). In the embodiments illustrated in the drawings, the second sub-block includes two sub-sub-blocks (two sub-regions), where the facets 18 are located in the first sub-sub-block (first sub-region), which in this case is optical block 100, and the facets 38 are located in the second sub-sub-block (second sub-region), which in this case is optical block 300.

In embodiments in which optical block 300 is omitted, the optical blocks 100, 200 are bonded together to form the optical block 400 such that the face 112b is joined to the face 212a. As a result of the bonding (and proper aligning) of the optical blocks 100, 200, the facets 18 are non-parallel to the facets 28.

Figure 8A:
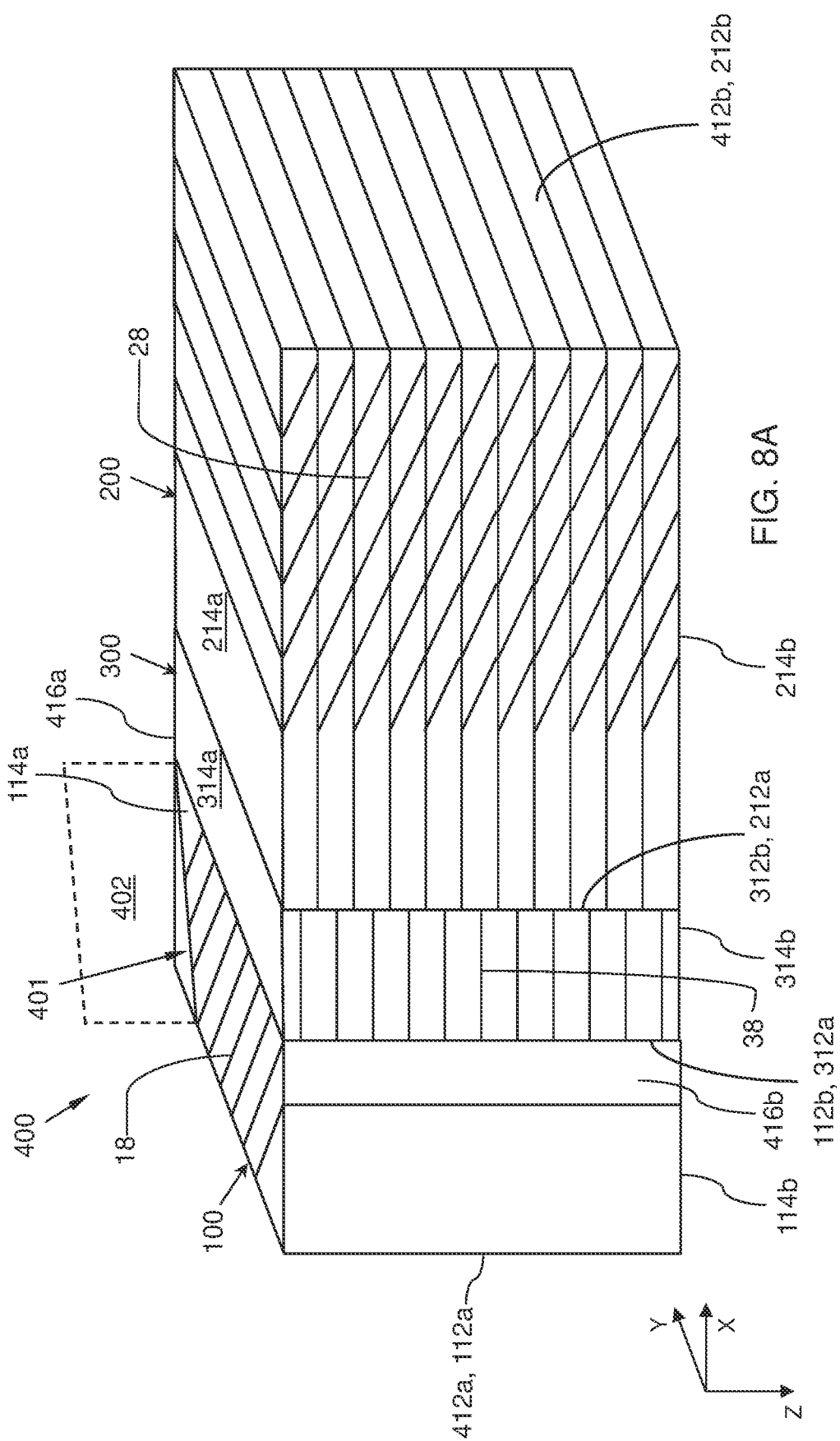
FIGS. 8A and 8B are schematic isometric and front views, respectively, of a cutting plane along which the optical block of FIGS. 7A-7C is cut to produce a new optical structure, according to embodiments of the present invention.
Figure 8B:
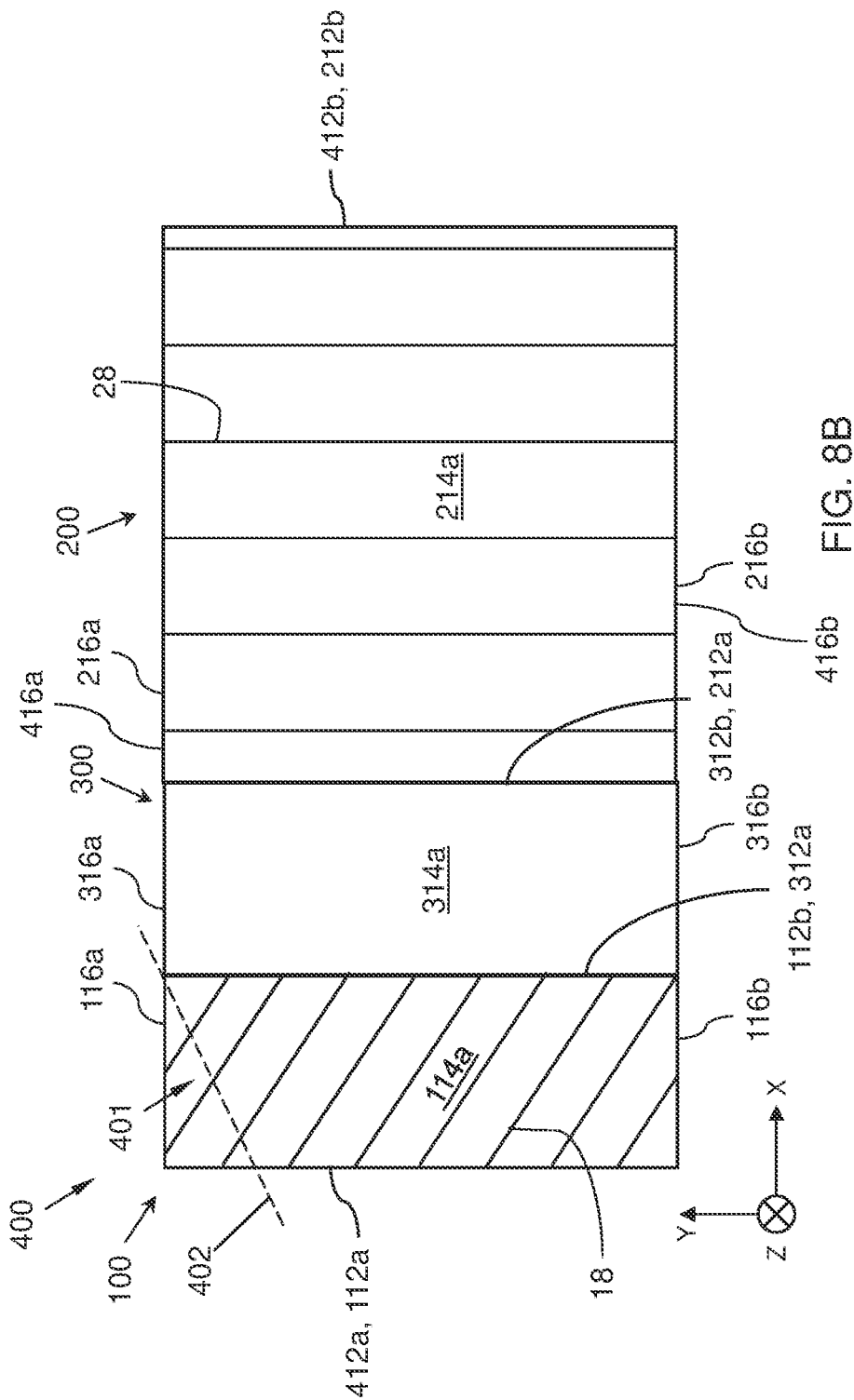
Figure 9A:
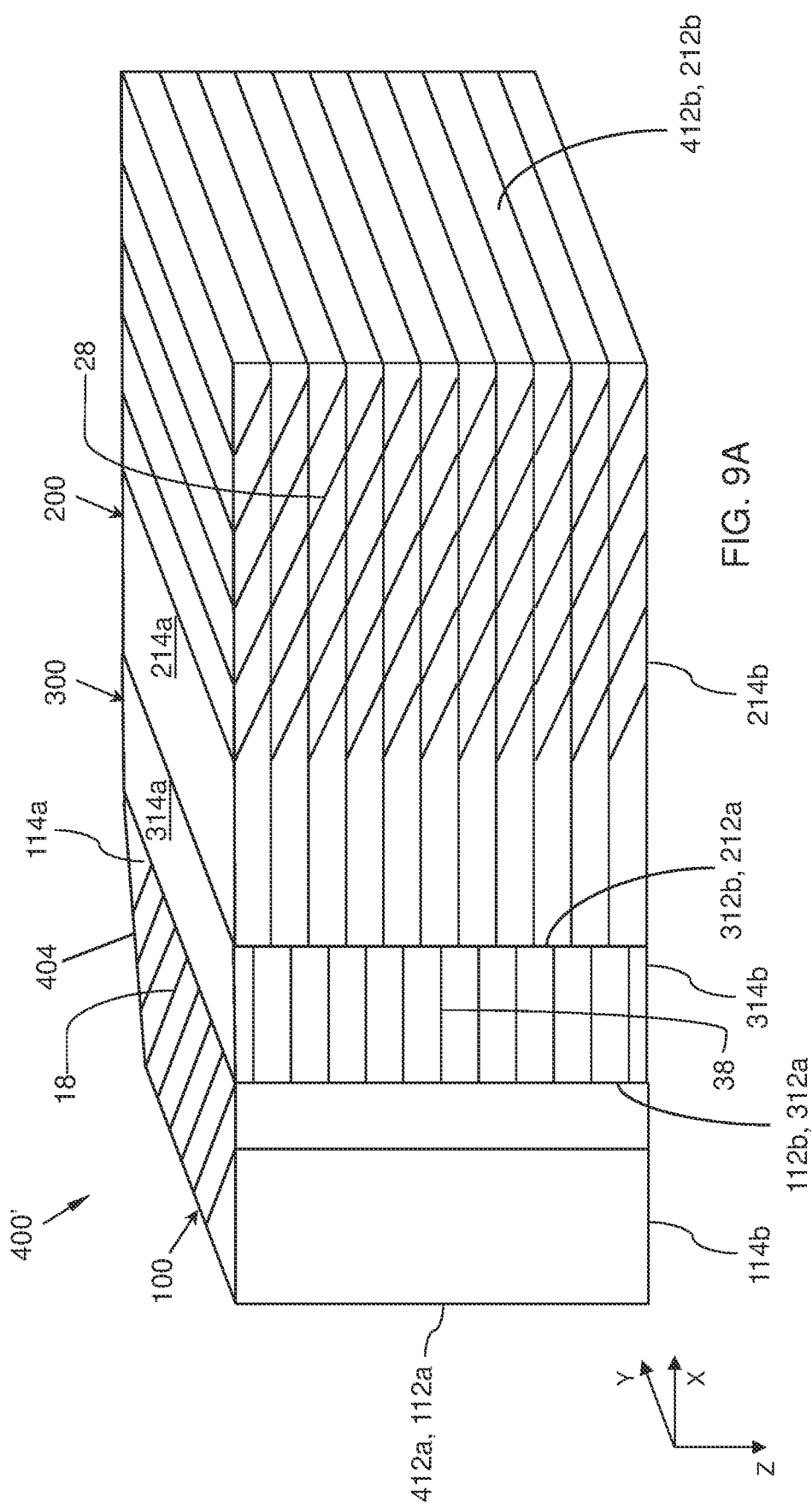
FIGS. 9A and 9B are schematic isometric and front views, respectively, of the optical structure formed by cutting the optical structure of FIGS. 8A and 8B along the cutting plane.
Figure 9B:
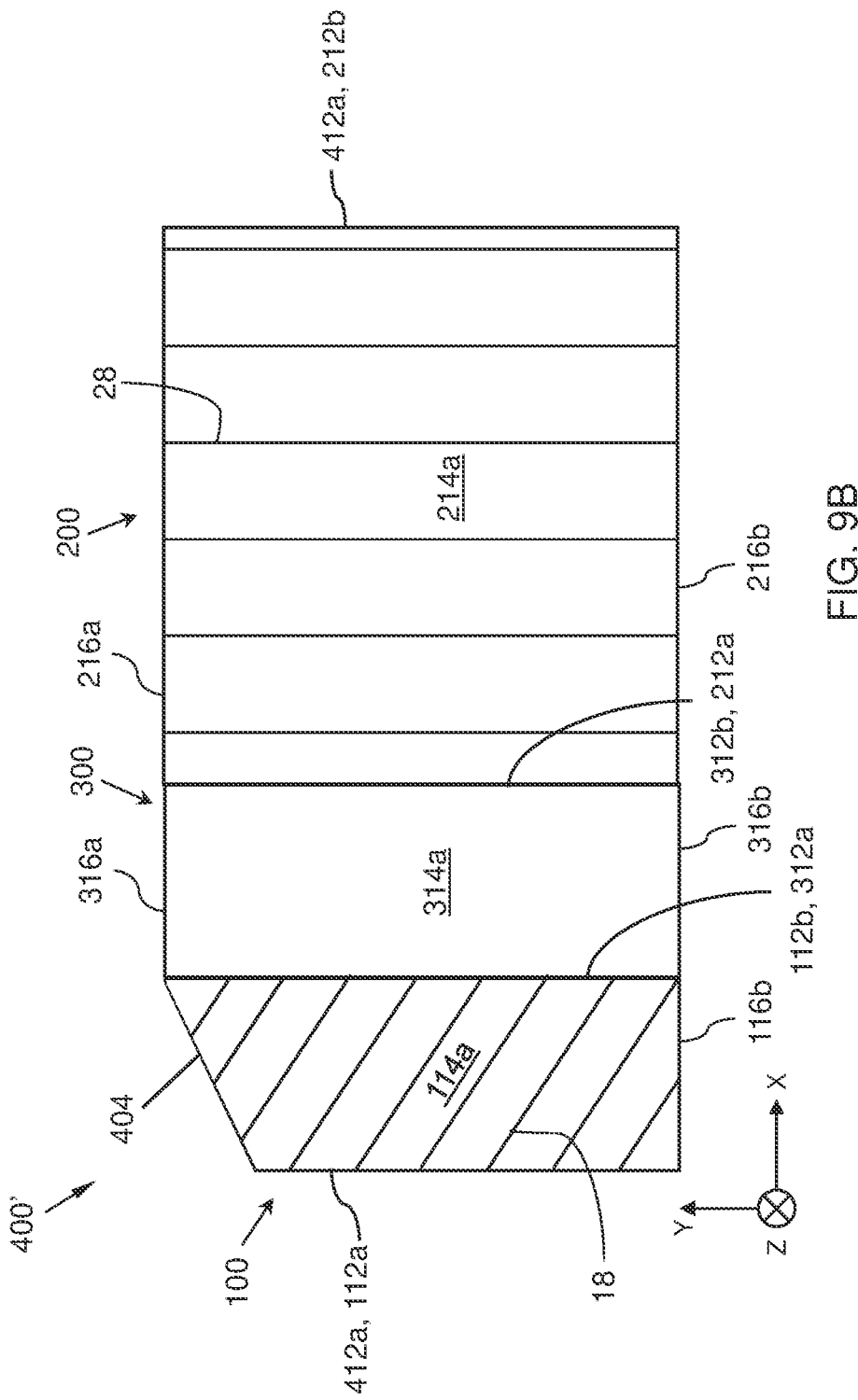

With continued reference to FIGS. 1A-7B, refer now to FIGS. 8A-9B, which illustrate steps for cutting the optical block 400 (FIGS. 8A and 8B) and the result of cutting the optical block 400 (FIGS. 9A and 9B). Generally speaking, and as shown in FIGS. 8A and 8B, the optical block 400 is cut along a cutting plane 402 that passes through the face 412a (which in the illustrated embodiment is face 112a, but may be face 312a in embodiments in which the positions of the optical blocks 100, 300 are exchanged) and at least one of the faces 116a, 216a, 316a. In embodiments in which the faces 116a, 216a, 316a are coplanar and form the face 416a, the cutting plane 402 passes through the face 416a. The location of the cutting plane 402 is such that the cutting plane 402 at least passes through a portion of the optical sub-block having the facets 18 or facets 38. In the illustrated embodiment, the cutting plane 402 passes through a portion of the optical sub-block having the facets 18, which in the illustrated embodiment is the optical block 100. However, in some practical implementations, the cutting plane 402 may pass through all three regions of the optical block 400 (i.e., pass through regions which in combination contain facets 18, 38, 28).

In certain embodiments, the cutting plane 402 is oblique to the face 412a (112a or 312a), and may also be oblique to one or more of the faces 116a, 316a, 412b, 112b, 312a, 312b, 212a, depending on the construction of the optical block 400. The cutting plane 402 is preferably perpendicular to the face 114a (and therefore also perpendicular to faces 314a, 214a in embodiments in which the faces 114a, 314a, 214a are parallel). The cutting of the optical block 400 along cutting plane 402 results in the formation of an optical structure 400' having an interfacing surface 404 (or "face" 404) at the location of the cutting plane 402, as illustrated in FIGS. 9A and 9B.

In some of the embodiments in which the optical block 400 comprises the three optical blocks 100, 200, 300 as illustrated in FIGS. 7A-7C, the location of the cutting plane 402 can be restricted such that the cutting plane 402 only passes through a portion of the optical block 100 and does not pass through any of the other optical blocks 200, 300 such that the portion to be cut is exclusively part of the optical block 100. However, in other embodiments, the location of the cutting plane 402 may be such that the cutting plane 402 passes through a portion of the optical block 300 and may also pass through a portion of the optical block 200.

In embodiments in which the faces 116a, 216a, 316a are coplanar and combine to form the face 416a, the portion of the optical block 400 that is cut-off (i.e., removed) is a triangular prism (typically a right triangular prism) portion (represented in FIGS. 8A and 8B by 401). In embodiments in which the optical block 300 is sandwiched between the optical blocks 100, 200, the portion 401 includes a portion (typically the entirety) of the face 116a and a portion (which may be a minority portion, for example roughly 10%-20%) of the face 112a.

In some of the embodiments in which the positions of the optical blocks 100, 300 is exchanged such that the optical block 100 is sandwiched between the optical blocks 300 and 200, the location of the cutting plane can be restricted such that the cutting plane 402 only passes through a portion of the optical block 300 and does not pass through any of the other optical blocks 100, 200, such that the portion to be cut is exclusively part of the optical block 300. However, similar to as mentioned above, in certain embodiments the cutting plane 402 may pass through a portion of the optical block 100 and may also pass through a portion of the optical block 200.

FIGS. 9A and 9B illustrate the optical structure 400', having the interfacing surface 404, that is formed as result of cutting the optical block 400 along the cutting plane 402 and removing triangular prims portion 401. The optical block 500, having coupling-in reflectors, is bonded to the optical structure 400' at the interfacing surface 404.

Figure 10A:
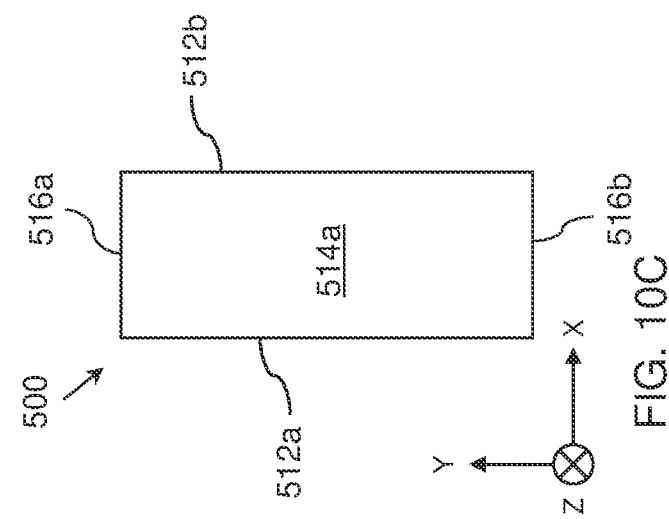
FIGS. 10A-10C are schematic isometric, side, and front views, respectively, of an optical block having a plurality of reflective internal surfaces that can be used to form coupling-in reflectors of compound LOEs, according to embodiments of the present invention.
Figure 10B:
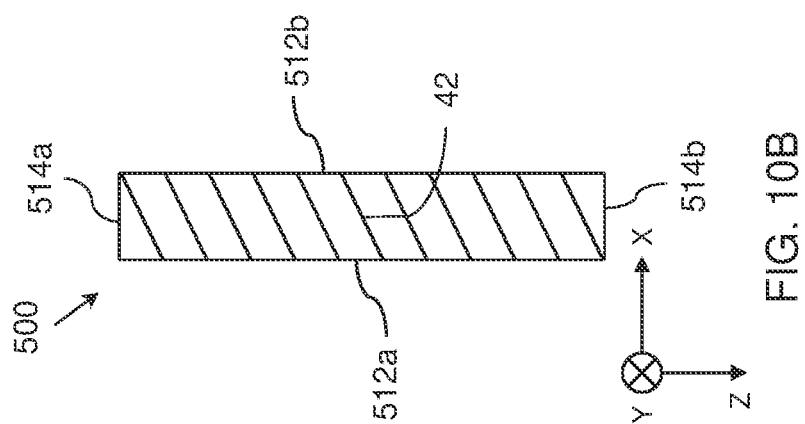
Figure 10C:
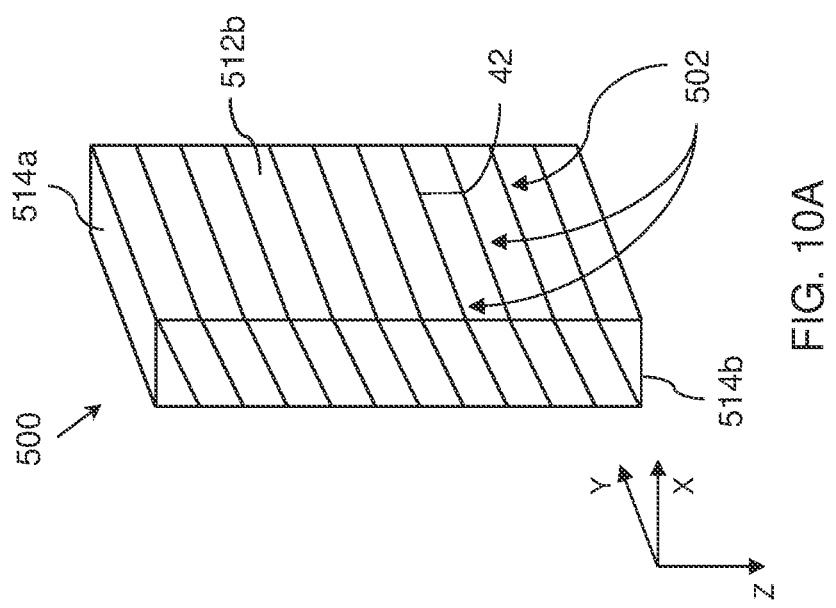

The following paragraphs describe the structure and production of the optical block 500 with reference to FIGS. 10A-10D. Referring first to FIGS. 10A-10C, the optical block 500 is formed from a light-transmitting material and has a set of reflective internal surfaces 42 (highly reflective mirrors), each of which is used as a coupling-in configuration for the final compound LOE. The optical block 500 includes three pairs of faces (major external surfaces), namely a pair of preferably parallel faces 512a, 512b, a pair of faces 514a, 514b (which may or may not be parallel faces), and a pair of faces 516a, 516b (which may or may not be parallel faces). In certain embodiments, the three pairs of faces of the optical block 500 are mutually orthogonal (perpendicular), however, other embodiments may be preferred in which the pairs of faces are not mutually orthogonal.

Figure 10D:
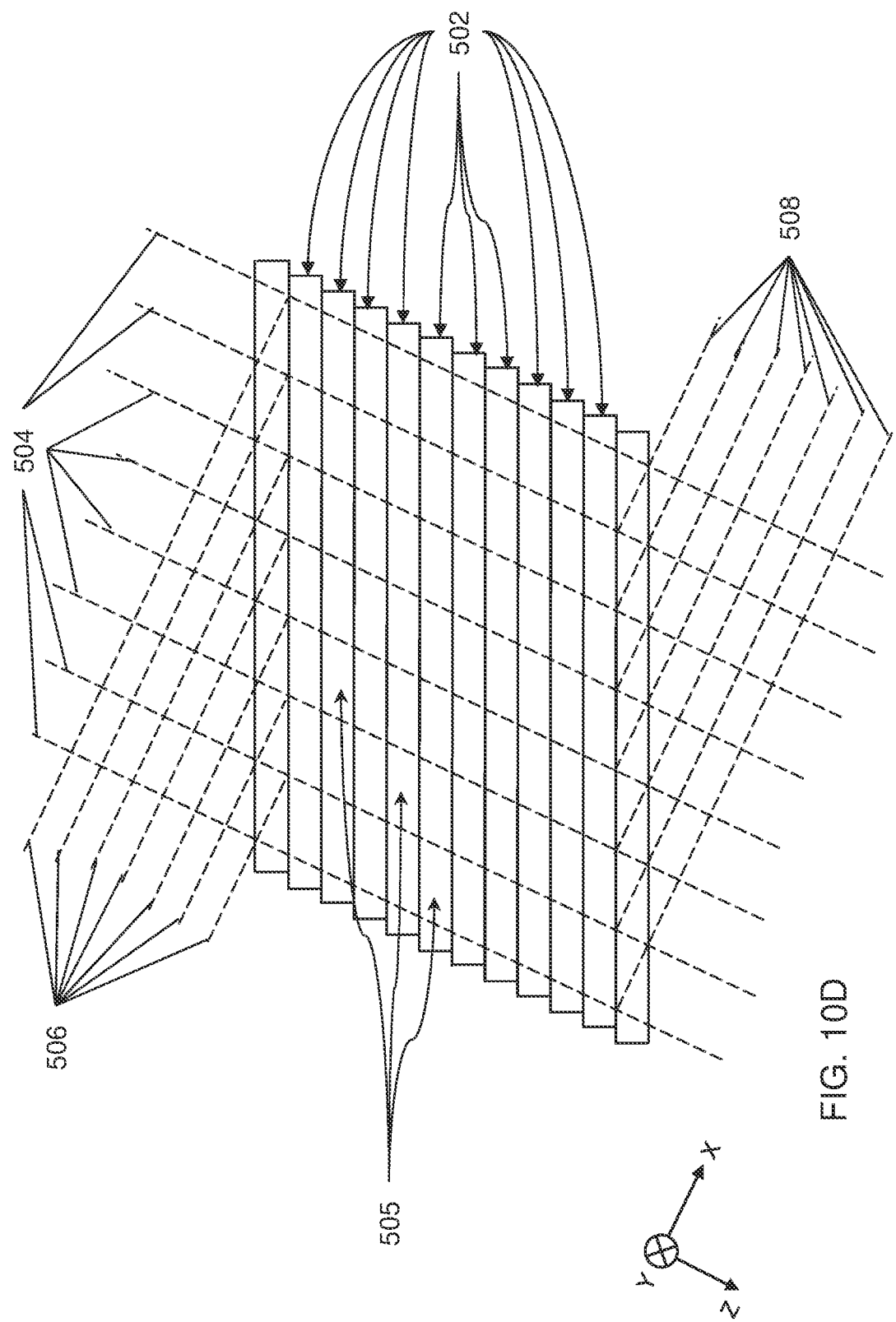
FIG. 10D is a schematic side view of a bonded stack of coated plates that can be cut at predetermined intervals to produce the optical block of FIGS. 10A-10C.

The optical block 500 can be formed from a plurality of bonded, transparent coated plates 502 (each plate being formed from a light-transmitting material and coated with a partially reflective coating) to form reflective internal surfaces 42 that are inclined obliquely to either or both of the faces 512a, 512b at a predetermined angle. Various known methods exist for forming the optical block 500. FIG. 10D illustrates one such method, in which the coated plates 502 are stacked and bonded (similar to as in FIGS. 3C, 4C, and 5C), and then cut along equally spaced parallel cutting planes 504 (which in the arbitrarily labeled xyz coordinate system are parallel to the yz plane) to produce sliced-out optical structures 505. One of the optical structures 505 is used to form the optical block 500. Unlike the coatings used to produce the facets 18, 28, 38, the coatings used to form coated plates 502 are not partially reflective but rather are fully (and preferably highly) reflective, such that the resultant internal surfaces 42 act as fully reflective mirrors. Dielectric coatings are one example of suitable coatings that can be used to form the reflective internal surfaces 42. The cutting planes 504 are obliquely angled relative to the coated faces the plates 502, where the oblique angle of the planes 504 determines the oblique angle at which the internal surfaces 42 are inclined relative to faces 512a, 512b.

In certain embodiments, each of the optical structures 505 can be cut along two additional parallel planes 506, 508 that are perpendicular to planes 504 in order to form surfaces 514a, 514b such that the optical block 500 has a rectangular cross-section. In the arbitrarily labeled xyz coordinate system, the planes 506, 508 are parallel to the xy plane.

Figure 11A:
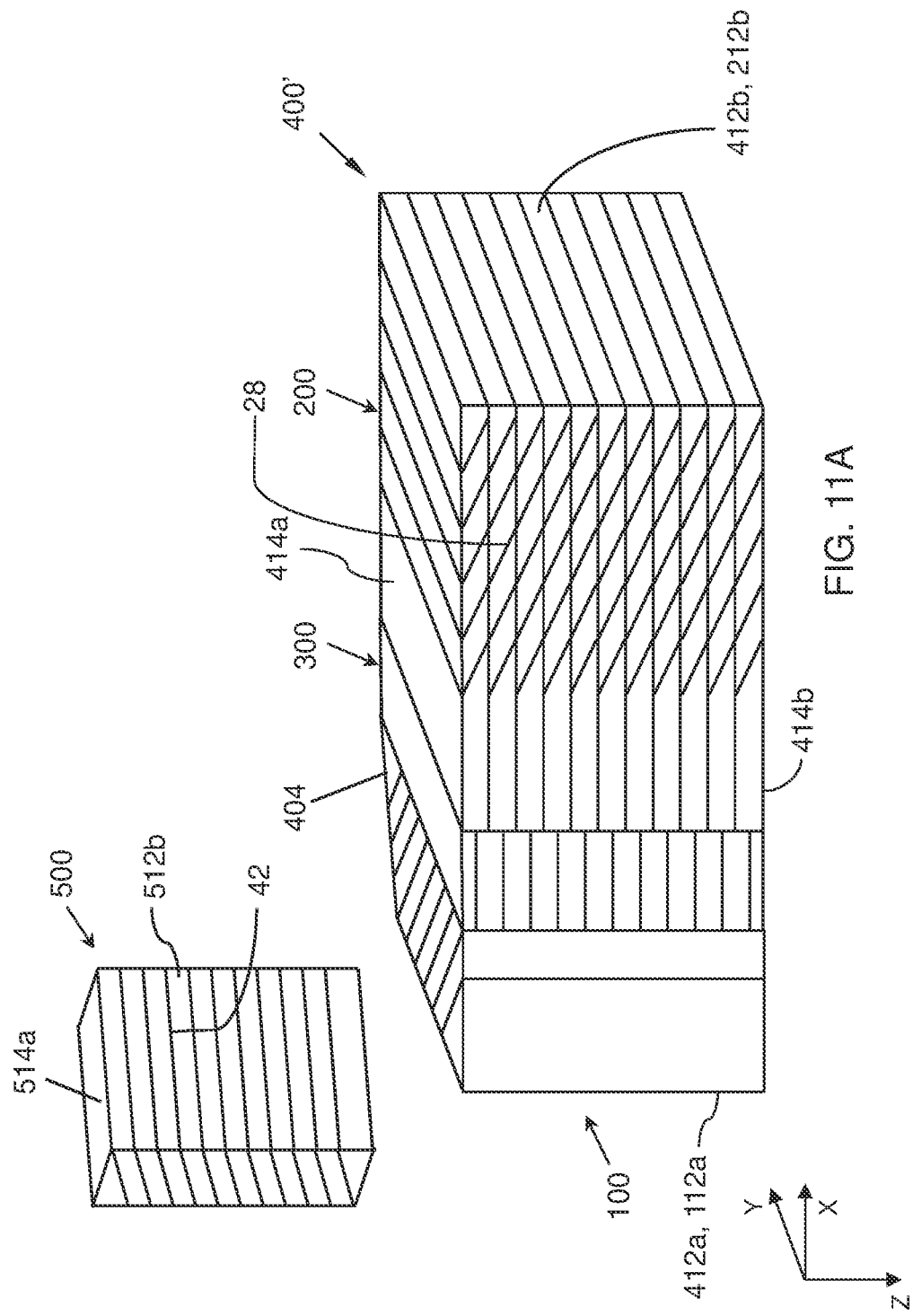
FIGS. 11A and 11B are schematic isometric and front views, respectively of the optical structure of FIGS. 9A and 9B and the optical block of FIGS. 10A-10C in alignment prior to being bonded together, according to embodiments of the present invention.
Figure 11B:
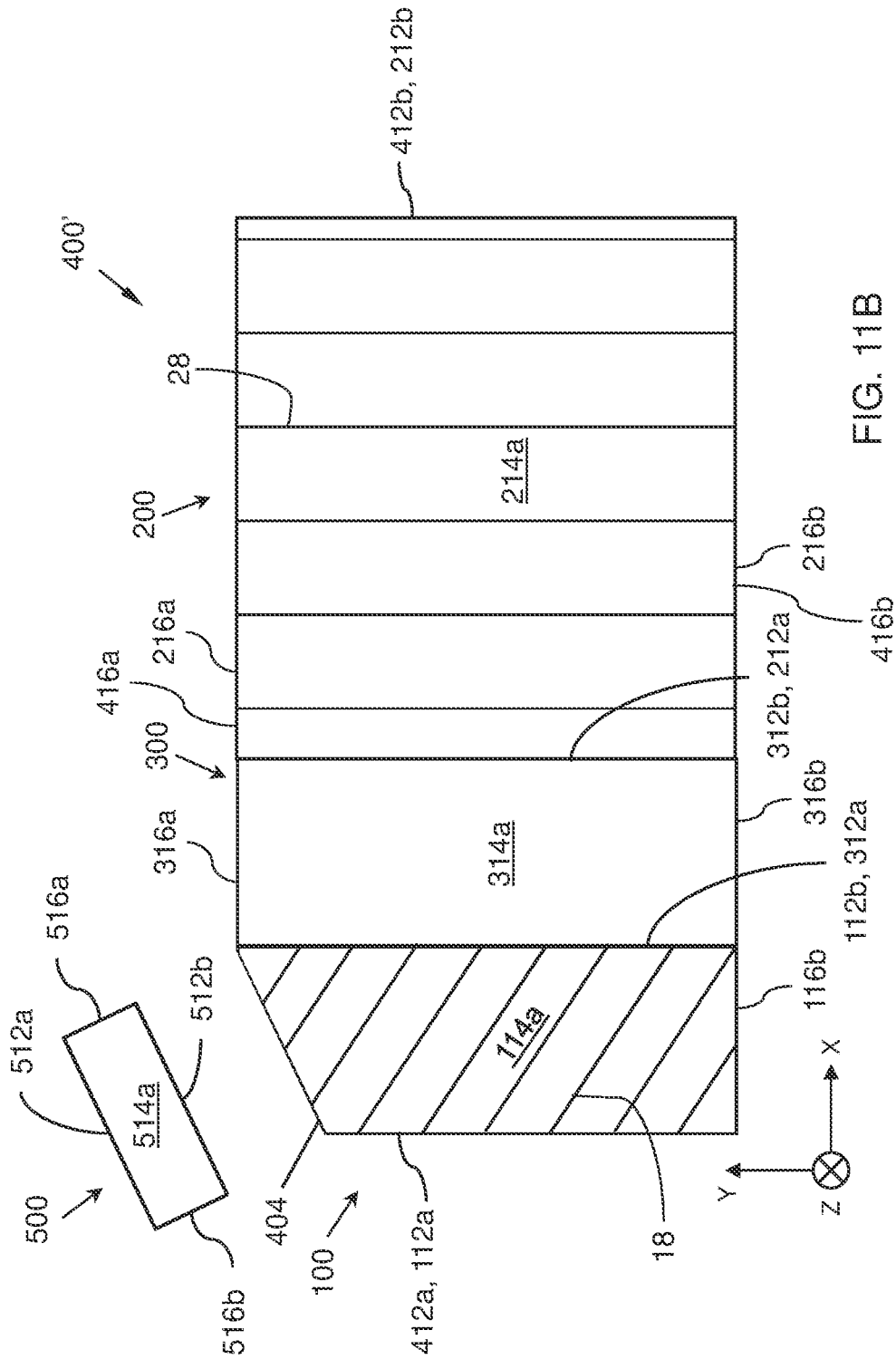
Figure 12B:
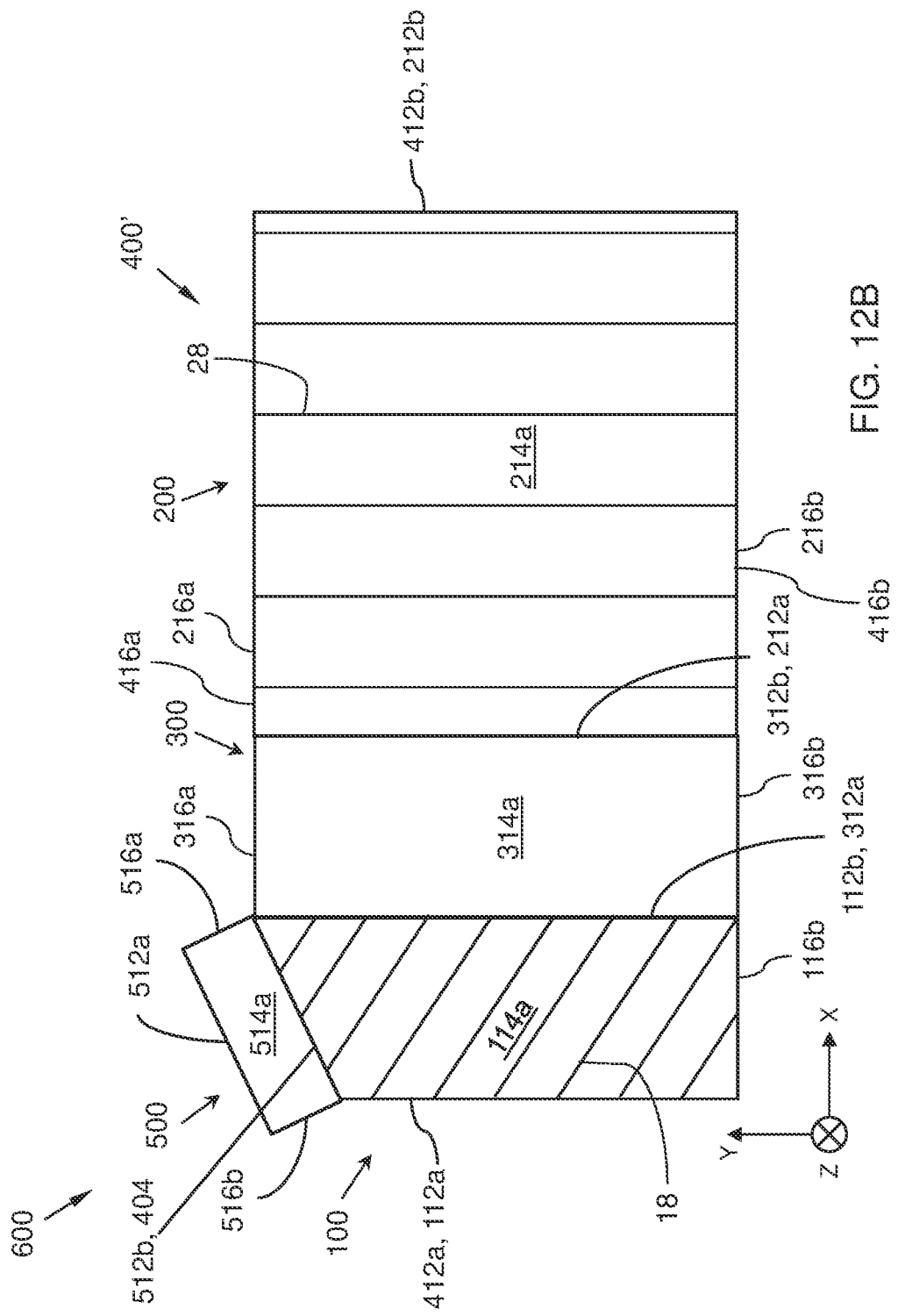

With continued reference to FIGS. 8A-10D, attention is also directed to FIGS. 11A and 11B which show the optical block 500 and the optical structure 400' prior to being bonded together to form optical structure 600 (FIGS. 12A and 12B). Prior to bonding, it is important that the optical block 500 and the optical structure 400' are appropriately aligned such that the orientation of the internal surfaces 42 is non-parallel to the orientations of the facets 18, 28, 38 (i.e., such that the internal surfaces 42 are non-parallel to the facets 18, 28, 38), and such that each internal surface 42 is associated with a respective one of the LOEs 20 in the optical block 200 such that the projection of the internal surface in the thickness dimension of the respective LOE (which in the arbitrarily labeled xyz coordinate system in the drawings is the yz plane) is bounded by the major surfaces 24a, 24b of the LOE 20.

In certain embodiments, it may also be preferable that each of the faces 514a, 414a is in a plane parallel to the xy plane, and that each of the faces 514b, 414b is in a plane parallel to the xy plane.

In order to avoid wastage at the final cutting step for slicing-out the compound LOE, the optical block 500 preferably has the same thickness (measured along the z-axis, i.e., between faces 514a, 514b) as the constituent optical blocks 100, 200, 300, and thus the same thickness as the optical structure 400'. In such embodiments, the alignment of the optical block 500 with the optical structure 400' is preferably such that the faces 514a, 414a are coplanar, as are the faces 514b, 414b. In such embodiments, the alignment of the optical block 500 with the optical structure 400' is also such that the faces 512b, 404 are aligned and practically coincident.

Once properly aligned, the optical block 500 and the optical structure 400' are bonded together as illustrated in FIGS. 12A and 12B to form optical structure 600 (which is an intermediate work product of a compound LOE fabrication process). The bonding of the optical block 500 and the optical structure 400' is such that the face 512b is joined to the face (interfacing surface) 404, while maintained the alignment described above. Preferably, the faces 512b, 404 are equally dimensioned, or very close to equally dimensioned. In certain embodiments, alignment of the optical block 500 with the optical structure 400' can also include twisting or rotating the face 512b relative to the interfacing surface 404, such that the internal surfaces 42 are tilted at angle relative to the optical structure 400' in addition to being inclined relative to either or both of the faces 512a, 512b. In the drawings, such a tilt angle and inclination angle correspond to the internal surfaces 42 being inclined at two angles relative to the xy plane.

Figure 13:
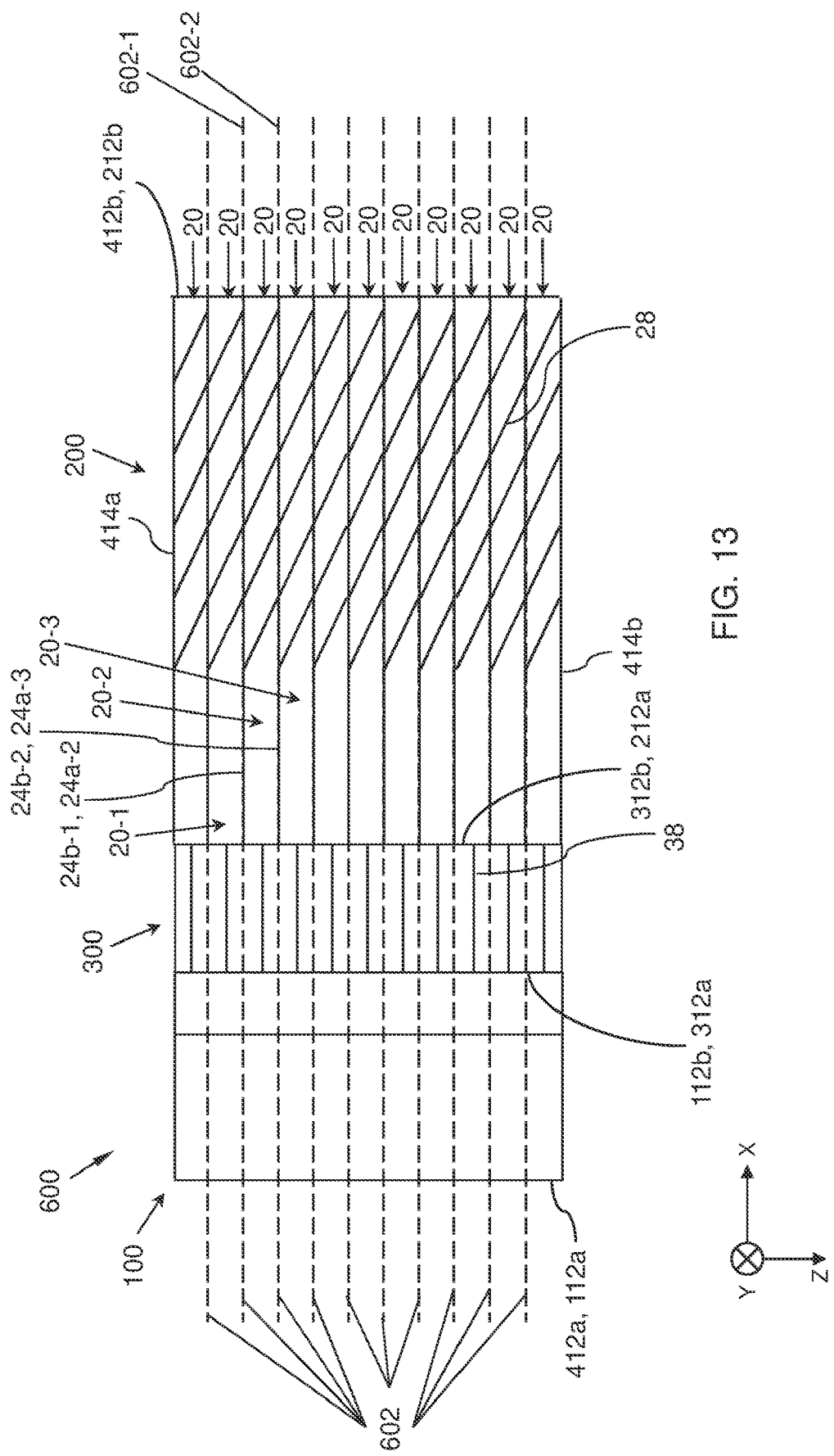
FIG. 13 is a schematic side view of the optical structure of FIGS. 12A and 12B showing cutting planes at predetermined intervals along which the optical structure can be cut to extract one or more compound LOEs, according to embodiments of the present invention.

As illustrated in FIG. 13, after forming the optical structure 600, the optical structure 600 is cut (sliced) along two or more preferably parallel cutting planes 602 at predetermined intervals in order to extract one or more compound LOEs. The cutting planes 602 are preferably parallel to the major external surfaces 24a, 24b of the LOEs 20 that form the optical block 200. Most preferably, consecutive cutting planes 602 are located between the surfaces 24a, 24b of consecutive LOEs 20, in particular the bonding regions formed between the surfaces 24a, 24b of consecutive LOEs 20. For example, a first 602-1 of the cutting planes 602 passes between the bonding region between the second surface 24b-1 of a first one 20-1 of the LOEs 20 and the first surface 24a-2 of a second one 20-2 of the LOEs 20 that is adjacent to the first LOE 20-1 and bonded to the first LOE 20-1, and a second 602-2 of the cutting planes 602 that is adjacent to the first cutting plane 602-1 passes between the bonding region between second surface 24b-2 of the second LOE 20-2 and the first surface 24a-3 of a third one 20-3 of the LOEs 20 that is adjacent to the second LOE 20-2 and bonded to the second LOE 20-2. It is noted herein that the bonding regions (formed between the surfaces 24a, 24b of consecutive LOEs 20) can provide guides for placement of the cutting planes 602. It is further noted that minor deviations from parallelism of the cutting planes which result in the two major surfaces, formed by cutting along consecutive cutting planes 602, of a sliced-out compound LOE being approximately parallel but not perfectly parallel can be corrected by polishing the compound LOEs along the two major surfaces.

With additional reference to FIGS. 14A-14C, there is shown one compound LOE 700 that is sliced-out from the optical structure 600 after cutting along cutting planes 602. The compound LOE 700 includes a first pair of faces 712a, 712b (that include parts of faces 412a, 412b, and which may or may not be parallel faces), a second pair of parallel faces 714a, 714b (major surfaces) formed by cutting the optical structure 600 along consecutive cutting planes 602 (and preferably formed in part by surfaces 24a, 24b of one of the LOEs 20), and a third pair of faces 716a, 716b (that include parts of faces 416a, 416b, and which may or may not be parallel faces). Most notably, the compound LOE 700 has a first plurality of facets 18 (in a first LOE region 710) having a first orientation and which also may be inclined obliquely to the faces 714a, 714b or orthogonal to the faces 714a, 714b, a second plurality of facets 28 (in a second LOE region 720) inclined obliquely to the faces 714a, 714b and having an orientation non-parallel to the orientation of the facets 18, and at least one facet 38 located in a region 730 between the first and second LOE regions and having an orientation parallel to the faces 714a, 714b and non-parallel to the orientations of the facets 18, 28. The compound LOE 700 also includes a (highly) reflective internal surface 42 (also referred to as a coupling-in reflector) located in a coupling-in region 750 bounded by faces 512a, 514a', 514b' 516a, 516b, and having an orientation that is non-parallel to the orientations of the facets 18, 28, 38 (i.e., reflective internal surface 42 is non-parallel to the facets 18, 28, 38). Faces 514a', 514b' are mutually parallel faces and form part of faces 714a, 714b. In embodiments in which the face 512b of the optical block 500 (or face 512b' of block 500' or face 582 of block 580/590) is twisted or rotated relative to the interfacing surface 404, the reflective surface 42 is tilted about two axes relative to the waveguide axes (which can be a tilt angle measured relative to the x-axis and the y-axis in the arbitrarily labeled xyz coordinate system in the drawings).

As should be apparent, unlike the compound LOEs illustrated in FIGS. 1A-2B, the compound LOE 700 does not have a rectangular cross-section in the two-dimensional planes (mostly noticeable in the xy plane shown in FIG. 14B), due to the cutting and bonding steps described above with reference to FIGS. 8A-12B.

After slicing-out the compound LOEs 700, each of the compound LOEs can be polished on the external surfaces 714a, 714b in order to form a final compound LOE having a desired thickness (measured along the z-axis in the arbitrarily labeled xyz coordinate system in the drawings), and to ensure parallelism between the surfaces 714a, 714b (and the optional facet 38). FIG. 15 shows one view of the resulting polished compound LOE, with parallel surfaces 714a', 714b' corresponding to the surfaces 714a, 714b after being polished.

The compound LOE produced using the fabrication process according to the embodiments disclosed herein provide several advantages over compound LOEs produced using conventional fabrication methods. First, the location of the cutting plane 402 at the specified region of the optical block 400 (FIGS. 8A and 8B) accommodates placement of the coupling-in reflector 42 in a region that presents a more aesthetic overall design of the compound LOE 700. In addition, the spatial positioning of the coupling-in reflector 42, which is determined by the oblique angle of the cutting plane 402 and the oblique angle of the cutting planes 504 (FIG. 10D), determines the spatial orientation of the image projector that produces collimated image light. In the disclosed embodiments, the spatial orientation of the coupling-in reflector 42 can be designed to accommodate spatial positioning of the image projector below the compound LOE in association with a portion of the face 714b' at or near the coupling-in region 750, thereby providing aesthetic placement of the image projector and reducing the overall form factor of the optical system formed from the compound LOE and image projector, which can be implemented as part of a head-mounted display and in certain non-limiting implementations as part of an eyeglasses form factor. Furthermore, the reduced wastage of raw materials and the fact that a large number of compound LOEs can be sliced-out from a single optical structure 600 as enabled by the disclosed fabrication processes, facilitates large-scale production of the compound LOEs while maintaining lower manufacturing cost compared to conventional fabrication methods used to produce compound LOEs.

As mentioned, the compound LOE according to the disclosed embodiments can be attached or otherwise coupled to an image projector that produces collimated image light that can be coupled into the compound LOE by the reflective internal surface 42. In preferred embodiments, the coupling-in reflector is designed to accommodate spatial positioning of the image projector below the compound LOE. For both functional and aesthetic reasons, it is typically desired that the collimated image rays corresponding to the central field of view chief ray should generate an approximately perpendicular angle (up to approximately 20°) with relation to the compound LOE both at the input to the compound LOE from the image projector (i.e., input to the first LOE region via coupling-in from the reflective internal surface 42) and at the output of compound LOE to the eye of the observer (i.e., output from the second LOE region via facets 28). Accordingly, it is preferable that the reflective internal surface 42 and the facets 28 have similar elevation angle. In other words, the oblique angle of the reflective internal surface 42 measured relative to the faces 512a, 512b is often approximately equal to the oblique angle of the facets 28 measured relative to the faces 714a', 714b' (or equivalently measured relative to surfaces 24a, 24b of the constituent LOE 20 that forms the compound LOE).

In many cases, only a portion of the reflective internal surface 42 provides a useful active area that couples light from the image projector into the compound LOE, while the remaining portions of the reflective internal surface 42 either do not couple any light into the compound LOE, or couple in light at angles which result in unwanted reflections at major surfaces of the compound LOE that give rise to ghost images. In addition, the reflective coatings used to form coated plates 502 (FIG. 10D) for producing reflective internal surface 42 typically have a high cost, and therefore reduction of any unused (i.e., "inactive") area of the internal surfaces 42 can reduce manufacturing costs. Therefore, in order to reduce manufacturing costs and mitigate ghost images by preventing or reducing unwanted reflections, it may be advantageous to limit the size of the reflective internal surfaces 42 to the active area, and to fill the remaining area with a less expensive inert material (such as glass, plastic, or even metal).

With additional reference to FIGS. 16A-18B, the following paragraphs describe embodiments in which a reduced-sized reflective internal surface 42 is produced from a reduced-sized optical block 500' that is bonded together with one or more blocks 800, 900 of inert material such as, for example, glass, plastic, or metal. The material used to form blocks 800, 900 (referred to interchangeably herein as "inert blocks") can be the same or different. For example, both blocks 800, 900 can be formed from glass, or one of the blocks can be formed from glass and the other formed from plastic. The optical block 500' is similar in structure to the optical block 500, with the noted exception being that the length of the optical block 500' (which in the arbitrarily labeled xyz coordinate system in the drawings is measured along the y-axis) is reduced compared to the length of the optical block 500, thereby limiting the size of the internal surfaces 42 to only the useful active area. Due to the similarity of the structure of the optical blocks 500', 500, like reference numerals will be used to identify like components, with an apostrophe ("'") appended to the reference numerals of the optical block 500'.

The inert block 800 has three pairs of faces (major external surfaces), namely a first pair of preferably parallel faces 812a, 812b, a second pair of faces 814a, 814b (which may or may not be parallel faces), and a third pair of faces 816a, 816b (which may or may not be parallel faces). The optical block 500' is limited in size by the inert block 800, and therefore the inert block 800 can be understood to function as a ghost-reducing element, which limits the size of the internal surfaces 42 to only the useful active area. In certain embodiments, the block 800 is a rectangular cuboid.

The inert block 900 also has three pairs of parallel faces (major external surfaces), namely a first pair of preferably parallel faces 912a, 912b, a second pair of faces 914a, 914b (which may or may not be parallel faces), and a third pair of faces 916a, 916b (which may or may not be parallel faces). In certain embodiments, the block 900 is a rectangular cuboid. As will be discussed, the block 900 is optional, but can be used to advantage to provide structural reinforcement and support to the optical block 500'.

The bonding is preferably performed in stages, where the optical block 500' and the block 800 are first bonded together to form compound block 580. The blocks 500', 800 are appropriately aligned prior to being bonded together. With reference to the coordinate system shown in FIGS. 16A and 16B, the alignment of the blocks 500', 800 (when each of the blocks 500', 800 is constructed as a rectangular cuboid) can be understood as follows: the faces 512a', 812a are in a plane parallel to the yz plane and are preferably coplanar, the faces 512b', 812b are in a plane parallel to the yz plane and are preferably coplanar, the faces 514a', 814a are in a plane parallel to the xy plane and are preferably coplanar, the faces 514b', 814b are in a plane parallel to the xy plane and are preferably coplanar, and the faces 516b', 816a are aligned in a plane parallel to the xz plane and are coincident.

The blocks 500', 800 are bonded together to form compound block 580 such that the face 516b' is joined to the face 816a, while maintaining the alignment described with reference to FIGS. 16A and 16B. Block 580 is shown in FIGS. 17A and 17B, and has a first pair of preferably parallel faces 582a, 582b respectively formed from faces 512a', 812a and 512b', 812b, a second pair of faces 584a, 584b (which may or may not be parallel faces) respectively formed from faces 514a', 814a and 514b', 814b, and a third pair of faces 516a', 816b (which may or may not be parallel faces). The internal surfaces 42 are in a first region of the block 580 and are inclined obliquely to the faces 582a, 582b.

Figure 18B:
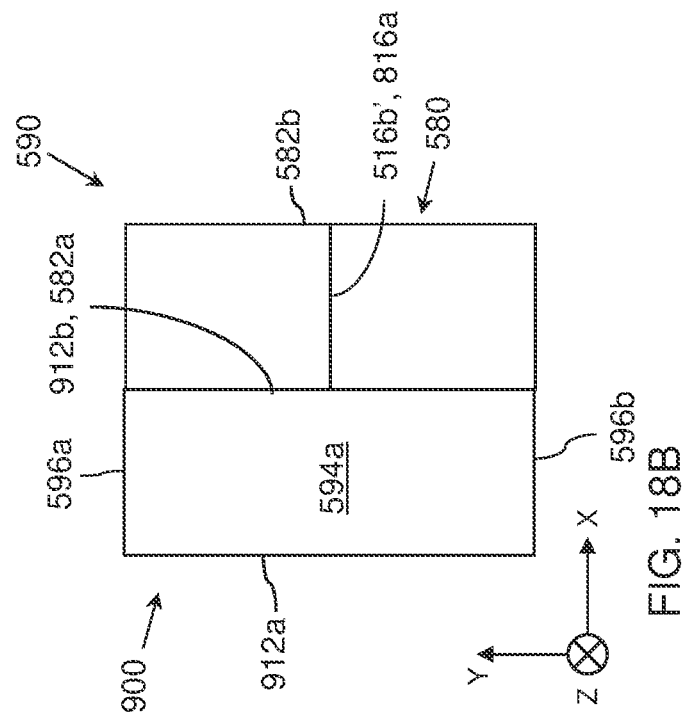
FIGS. 18A and 18B are schematic isometric and front views, respectively, corresponding to FIGS. 17A and 17B, showing the second inert block and the compound block bonded together to form a second compound block, according to embodiments of the present invention.
Figure 18A:
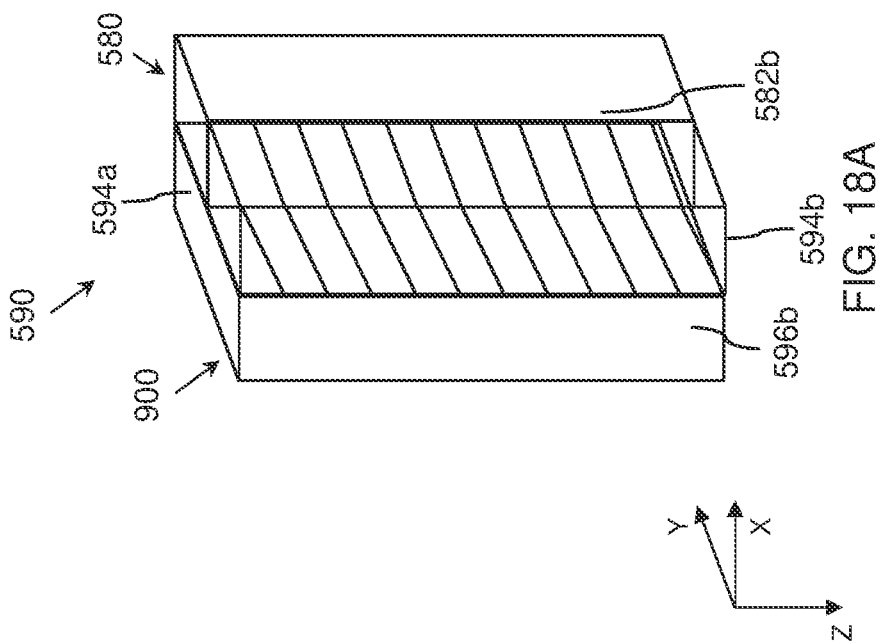

In certain embodiments, the blocks 580, 900 can then be bonded together to form compound block 590, as illustrated in FIGS. 18A and 18B. The blocks 580, 900 are appropriately aligned prior to being bonding together. With reference to the coordinate system shown in FIGS. 17A and 17B, the alignment of the blocks 580, 900 (when each of the blocks 580, 900 is constructed as a rectangular cuboid) can be understood as follows: the faces 516a', 916a are in a plane parallel to the xz plane and are preferably coplanar, the faces 516b', 916b are in a plane parallel to the xz plane and are preferably coplanar, the faces 584a, 914a are in a plane parallel to the xy plane and are preferably coplanar, the faces 584b, 914b are in a plane parallel to the xy plane and are preferably coplanar, and the faces 582a, 912b are aligned in a plane parallel to the yz plane and are coincident.

The blocks 580, 900 are bonded together to form compound block 590 such that the face 912b is joined to the face 582a, while maintaining the alignment described with reference to FIGS. 17A and 17B. Block 590 is shown in FIGS. 18A and 18B and has a first pair of parallel faces 912a, 582b, a second pair of faces 594a, 594b (which may or may not be parallel faces) respectively formed from faces 914a, 584a and 914b, 584b, and a third pair of faces 596a, 596b (which may or may not be parallel faces) respectively formed from faces 916a, 586a and 916b, 586b.

Figure 19A:
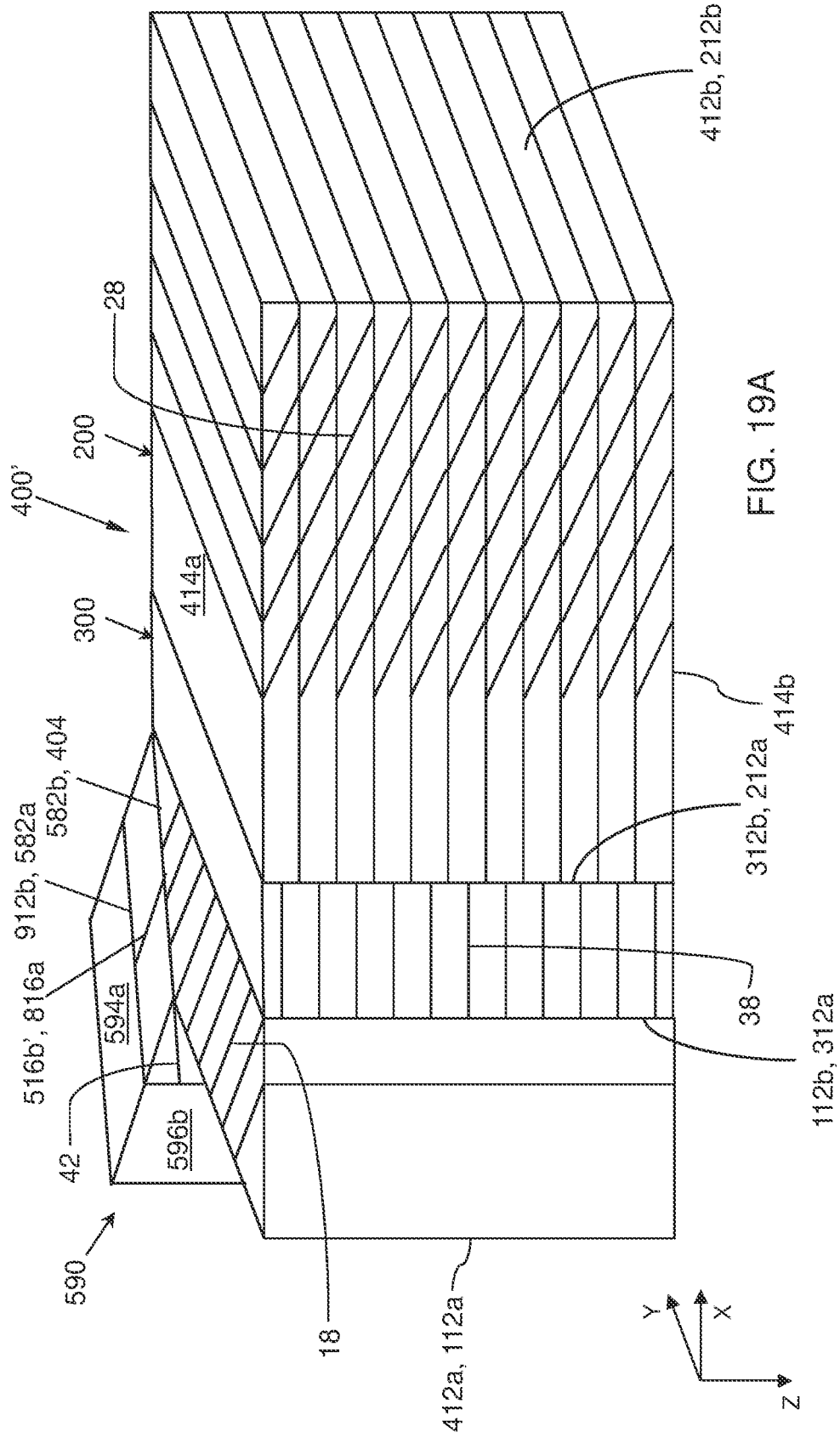
FIGS. 19A and 19B are schematic isometric and front views, respectively, similar to FIGS. 12A and 12B, but showing the compound block of FIGS. 18A and 18B and the optical structure of FIGS. 9A and 9B bonded together to form an optical structure, according to embodiments of the present invention
Figure 19B:
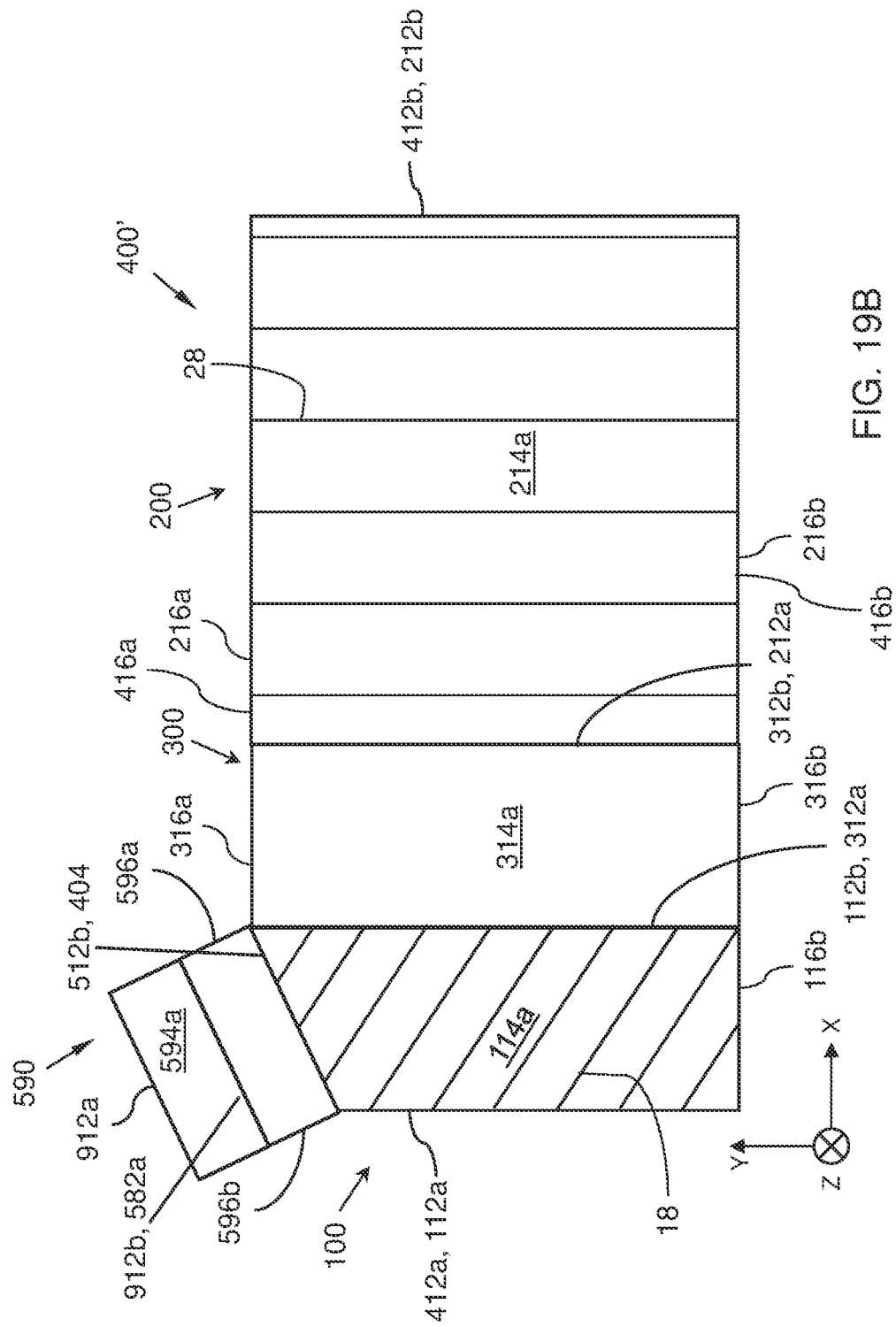

Block 590 can then be aligned and bonded together with the optical structure 400' in place of optical block 500, similar to as described with reference to FIGS. 11A-12B. When using block 590 instead of block 500, the bonding of block 590 together with the optical structure 400' is such that the face 582b is joined to interfacing surface 404, as shown in FIGS. 19A and 19B. As a result, only a fractional portion of the interfacing surface 404 is joined to the face 512b' (which forms part of face 582b). This is in contrast to the embodiment illustrated in FIGS. 12A and 12B, in which the entirety of the face 512b is joined to the entirety of the interfacing surface 404. The optical structure formed as a result of bonding together block 590 and optical structure 400' can then be sliced at predetermined intervals demarcated by parallel cutting planes in order to extract one or more compound LOEs, similar to as described with reference to FIG. 13.

In certain embodiments, the inert block 900 can be bonded without the inert block 800 in order to provide structural reinforcement and support to the optical block 500. For example, in one embodiment, the inert block 900 and the optical block 500 are bonded together to form an intermediate block such that the face 912b is joined to the face 512a of the optical block 500. In such an embodiment, the inert block 900 and the optical block 500 are appropriately aligned prior to being bonding together.

In another similar embodiment, the inert block 900 and the optical block 500' are bonded together without the presence block 800. In such an embodiment, the bonding is such that that the face 912*b* is joined to the face 512*a'* of the optical block 500'. In such an embodiment, the inert block 900 and the optical block 500' are appropriately aligned prior to being bonding together. Optionally, the size of the inert block 900 can be reduced to match the size of the optical block 500'.

In certain embodiments, it may be advantageous to provide a transparent cover plate on either or both of the polished surfaces 714*a'*, 714*b'* of the sliced-out compound LOE, such as the compound LOE illustrated in FIG. 15. In certain embodiments, such transparent cover plates can be provided directly to the surfaces 714*a'*, 714*b'* (i.e., after the sliced-out compound LOE is polished).

Figure 20A:
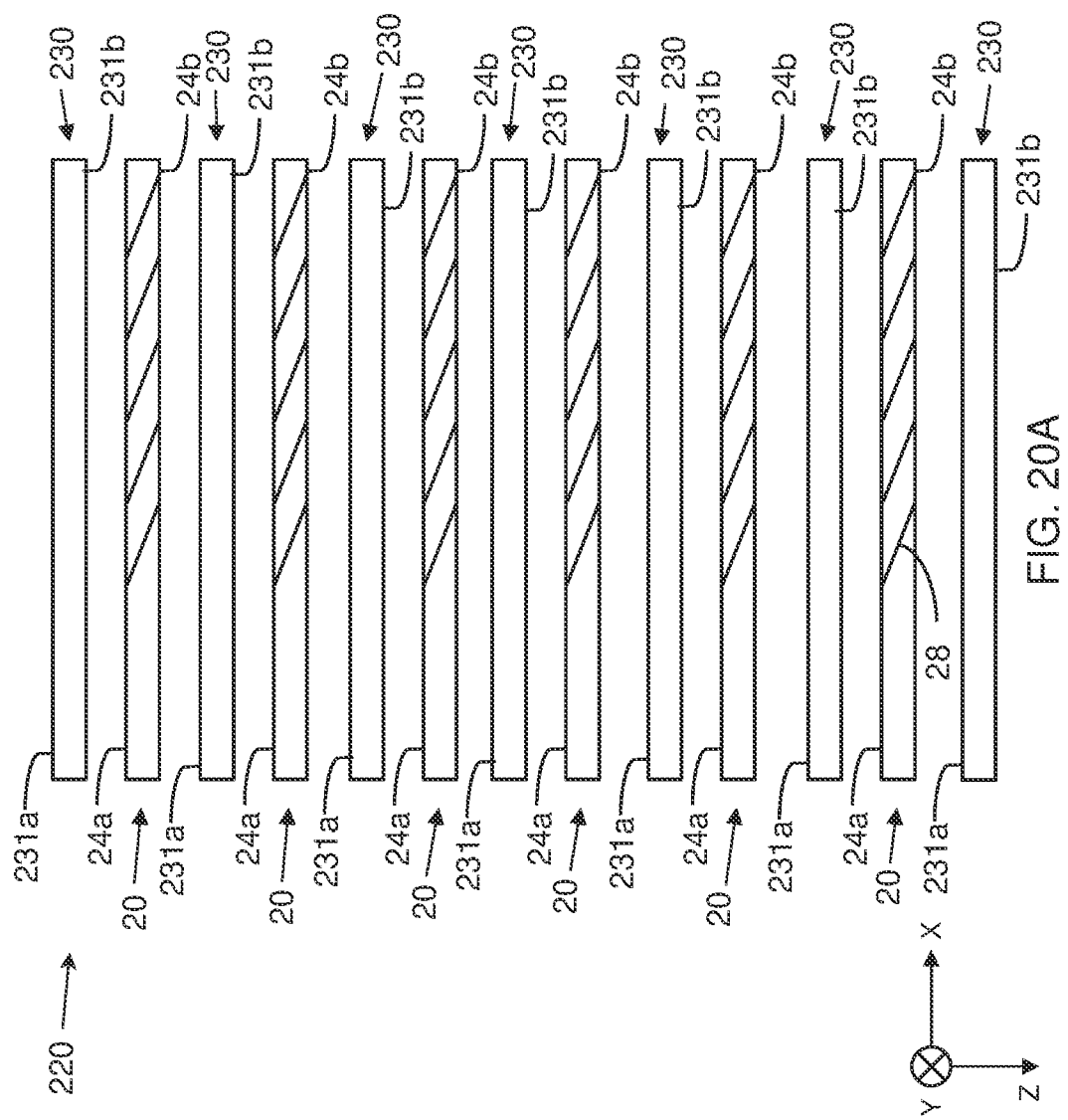
FIG. 20A is a schematic side view similar to FIG. 3D, but showing the LOEs arranged in alternating formation with a plurality of transparent cover plates prior to the LOEs and the transparent cover plates being bonded together, according to embodiments of the present invention.

In other embodiments, the transparent cover plates can be provided as spacer plates between the LOEs 20 during production of the optical block 200, as shown in FIGS. 20A and 20B. Looking first at FIG. 20A, there is illustrated an aligned arrangement 220 of LOEs 20 and transparent cover plates 220, in which the LOEs 20 and the cover plates 230 alternate along a length of the arrangement 220 perpendicular to the parallel faces 24*a*, 24*b* of the LOEs 20 (here the length is along the z-axis). Each cover plate 230 has a pair of parallel external faces 231*a*, 231*b*. The cover plates 230 and the LOEs 20 are bonded together to form a bonded stack 200' (also referred to as optical block 200'), as shown in FIG. 20B. The bonding is such that the faces 231*b*, 24*a* of adjacent cover plates 230 and LOEs 20 are joined, and such that the faces 231*a*, 24*b* of adjacent cover plates 230 and LOEs 20 are joined.

The stack 200' is generally similar in structure to the stack 200 of FIG. 3A (i.e., the stack 200' has three pairs of parallel faces and is formed from a plurality of bonded LOEs) and the like reference numerals will be used to denote like elements. One notable difference between stacks 200 and 200' is that the stack 200' is a bonded stack of LOEs 20 and cover plates 230 in which the LOEs 20 and the cover plates 230 alternate along a length of the stack 200' that is perpendicular to the faces 214*a*, 214*b* (and parallel to faces 212*a*, 212*b*). These transparent cover plates 230 are also referred to as transparent spacer plates, as they provide spacing between consecutive LOEs.

In embodiments in which optical block 200' is provided, having LOEs 20 provided with spacer plates 230 therebetween, the thickness of the coated plates 302 used in forming optical block 300 should be adjusted to account for the overall thickness of the optical block 200' and to ensure that alignment of the optical blocks 200', 300 results in each facet 38 being located in a plane that is halfway between the major surfaces 24*a*, 24*b* of the associated LOE 20 such that the optical blocks 200', 300 are bonded together at the proper alignment. In addition, when performing the cutting step to slice-out compound LOEs when employing optical block 200' instead of optical block 200, the consecutive cutting planes should pass through consecutive spacer plates 230 having one of the LOEs 20 therebetween, as illustrated in FIG. 21, and preferably pass approximately through the center of the spacer plates 230.

An example of a sliced-out compound LOE 700 having two transparent cover plates 232, 234 is illustrated in FIG. 22. The cover plates 232, 234 are formed from two of the cover plates 230 in the stack 200' that are sliced along two of the cutting planes 602. The cover plates 232, 234 are bonded to the LOE 20 such that the face 231*b* of cover plate 232 is joined to the face 24*a* of LOE 20, and the face 231*a* of cover plate 234 is joined to the face 24*b* of LOE 20. The face 233*a* of the cover plate 232 (which is opposite face from face 231*b* of cover plate 232), and the face 233*b* of the cover plate 234 (which is opposite from face 231*a* of cover plate 234) respectively form part of the major external surfaces 714*a*, 714*b* of the compound LOE 700. The surfaces 714*a*, 714*b* of the compound LOE of FIG. 22 can then polished, similar to as described above with reference to FIG. 15 to achieve a final compound LOE having a desired thickness and to ensure parallelism between the faces 714*a*, 714*b*.

Although the embodiments described herein have pertained to bonding the optical block 500 (or 500') to the optical structure 400' such that the coupling-in reflector 42 accommodates spatial positioning of the image projector below the final compound LOE product, other embodiments are possible which accommodate different spatial positioning of the image projector. For example, the optical block 500 can be inverted (for example by exchanging the positions of the faces 514*a*, 514*b*) such that the internal surfaces 42 are inclined upward, rather than downward as shown in FIGS. 10A, 10B, 11A, and 12A. Such a configuration allows deployment of the image projector above the final compound LOE product.

Although not illustrated in the drawings, additional optical components, such as prisms, can be optically coupled or bonded with the optical block 500 (or 500'), with or without inert blocks 800 and/or 900, prior to slicing-out the compound LOE in order to provide additional coupling-in geometries of the final compound LOE product. Alternatively, in addition, one or more additional optical components, such as a prism, can be optically coupled or bonded with the coupling-in reflector 42 at the coupling-in region 750.

The present disclosure has described various cutting steps in which optical materials are cut along cutting planes in order to produce various optical blocks and sub-components of optical blocks. It is noted that in certain embodiments, some or all of the surfaces that result from these cutting steps can be polished prior to bonding steps. For example, the joined faces of the optical blocks 100, 200, 300 can be polished prior to bonding together the optical blocks 100, 200, 300. In addition, the major surfaces of the LOEs used to form the optical block 200 can be polished prior to forming the bonded stack of LOEs (optical block 200). Furthermore, the interfacing surface 404 and the joining face of the optical block 500 can be polished prior to bonding together the optical blocks 400, 500.

The alignment of the various blocks and structures described herein can be performed using any suitable optical alignment apparatus/device(s)/tool(s) that perform suitable optical alignment techniques/methods. Such suitable optical alignment apparatus/device(s)/tool(s) can include, for example, one or more computerized control device, one or more computerized processing device, one or more optical subsystem having, for example, one or more light source, one or more light detector/sensor, one or more optics (e.g., one or more lens, folding optics, etc.), autocollimators, and the like. Details of non-limiting examples of suitable optical alignment apparatus/device(s)/tool(s)/method(s) that can be used for aligning the various blocks and structures described herein can be found in various publications by Lumus Ltd. (Israel), including, for example, International Patent Application No. PCT/IL2021/051377 and International Patent Application No. PCT/IL2021/051378, which are unpublished as of the filing date of this application and do not constitute prior art.

The cutting or slicing of the optical blocks and the optical structures described herein can be performed by any suitable cutting apparatus/device/tool, as should be understood by those of ordinary skill in the art. The polishing of the faces and surfaces of the optical blocks and optical structures (including the compound LOEs) described herein can be performed by any suitable polishing apparatus/device/tool, as should be understood by those of ordinary skill in the art.

Although the embodiments described thus far have pertained to bonding together two or three optical blocks respectively carrying two or three set of facets at prescribed orientations to accommodate deflection of light in prescribed directions, other embodiments are contemplated herein in which one or more additional optical blocks carrying one or more additional sets of facets or an optical retarder (such as one or more waveplates) at prescribed orientations are bonded to the aforementioned optical blocks. The scope of the present invention should not be limited to any particular number of the aforementioned optical blocks.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An optical structure that is an intermediate work product of a compound light-guide optical element (LOE) fabrication process, the optical structure comprising:
   a first region having a first pair of surfaces and a plurality of LOEs, each of the LOEs having a pair of major parallel surfaces and a first plurality of mutually parallel partially reflective internal surfaces oblique to the pair of major parallel surfaces;
   a second region having a second pair of surfaces and a second plurality of mutually parallel partially reflective internal surfaces non-parallel to the first plurality of partially reflective internal surfaces, a first one of the surfaces of the first pair of surfaces and a first one of the surfaces of the second pair of surfaces being joined together, the second region further including an internal surface formed at a plane that passes through a second one of the surfaces of the second pair of surfaces; and
   a third region having a third pair of surfaces and a plurality of mutually parallel reflective internal surfaces non-parallel to both the first plurality of partially reflective internal surfaces and the second plurality of partially reflective internal surfaces, a first one of the surfaces of the third pair of surfaces and the internal surface being joined together.

2. The optical structure of claim 1, wherein the second region has a pair of parallel external surfaces, and wherein the second plurality of partially reflective internal surfaces are perpendicular to the pair of parallel external surfaces of the second region.

3. The optical structure of claim 1, wherein the second region has a pair of parallel external surfaces, and wherein the second plurality of partially reflective internal surfaces are oblique to the pair of parallel external surfaces of the second region.

4. The optical structure of claim 1, wherein the second region has a third plurality of mutually parallel partially reflective internal surfaces non-parallel to the first and second pluralities of partially reflective internal surfaces.

5. The optical structure of claim 4, wherein the second region has a first sub-region that includes the second plurality of partially reflective internal surfaces and a second sub-region that includes the third plurality of partially reflective internal surfaces, wherein the first and second sub-regions of the second region are non-overlapping regions.

6. The optical structure of claim 4, wherein the third plurality of partially reflective internal surfaces are parallel to the major parallel surfaces of the plurality of LOEs.

7. The optical structure of claim 4, wherein each respective one of the third partially reflective internal surfaces is located in a plane that is approximately halfway between the pair of major parallel surfaces of a respective one of the LOEs of the plurality of LOEs.

8. The optical structure of claim 4, wherein the third plurality of partially reflective internal surfaces is located between the first and second pluralities of partially reflective internal surfaces.

9. The optical structure of claim 4, wherein the second plurality of partially reflective internal surfaces is located between the first and third pluralities of partially reflective internal surfaces.

10. The optical structure of claim 1, wherein the second region is formed by: i) bonding together first and second optical blocks that each have a pair of faces such that one of the faces of the pair of faces of the first optical block is joined to one of the faces of the pair of faces of the second optical block, and ii) cutting the first optical block along the plane to form the internal surface.

11. The optical structure of claim 10, wherein the first optical block includes the second plurality of partially reflective internal surfaces, and wherein the second optical block includes a third plurality of mutually parallel partially reflective internal surfaces non-parallel to the first plurality of partially reflective internal surfaces and non-parallel to the second plurality of partially reflective internal surfaces.

12. The optical structure of claim 1, wherein the third region includes at least one optically inert sub-region.

13. The optical structure of claim 1, wherein the internal surface is oblique to the second one of the surfaces of the second pair of surfaces.

14. The optical structure of claim 1, wherein the major parallel surfaces of the plurality of LOEs define a plurality of planes along which the optical structure is cut to extract one or more compound LOE.

15. The optical structure of claim 14, wherein each compound LOE of the extracted one or more compound LOE includes:

i) a pair of mutually parallel major external surfaces,
ii) a first set of mutually parallel partially reflective internal surfaces obliquely inclined to the pair of mutually parallel major external surfaces, the first set of mutually parallel partially reflective internal surfaces being from the first plurality of mutually parallel partially reflective internal surfaces,
iii) a second set of mutually parallel partially reflective internal surfaces oriented non-parallel to the first set of mutually parallel partially reflective internal surfaces, the second set of mutually parallel partially reflective internal surfaces being from the second plurality of mutually parallel partially reflective internal surfaces, and
iv) a reflective surface oriented non-parallel to both the first set of mutually parallel partially reflective internal surfaces and the second set of mutually parallel partially reflective internal surfaces, the reflective surface being one of the plurality of mutually parallel reflective internal surfaces.

* * * * *